United States Patent
Roberts, III et al.

(10) Patent No.: US 10,937,260 B1
(45) Date of Patent: *Mar. 2, 2021

(54) ELECTROCHROMIC FILM FOR A USER INTERFACE DISPLAY FOR ACCESS CONTROL

(71) Applicant: Schlage Lock Company LLC, Carmel, IN (US)

(72) Inventors: Rockwood T. Roberts, III, Carmel, IN (US); Brian C. Eickhoff, Danville, IN (US); Robert Prostko, Carmel, IN (US); Chris R. Snider, Noblesville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,011

(22) Filed: Aug. 30, 2019

(51) Int. Cl.
*G08B 21/00* (2006.01)
*G07C 9/00* (2020.01)
*G02F 1/163* (2006.01)
*G06F 3/14* (2006.01)

(52) U.S. Cl.
CPC ......... *G07C 9/00857* (2013.01); *G02F 1/163* (2013.01); *G06F 3/14* (2013.01)

(58) Field of Classification Search
CPC ........ G07C 9/00857; G02F 1/163; G06F 3/14
USPC .......................................................... 340/635
See application file for complete search history.

(56) References Cited

U.S. PATENT DOCUMENTS

2016/0294040 A1* 10/2016 Blair .................... H04B 5/0062

* cited by examiner

*Primary Examiner* — Tanmay K Shah
(74) *Attorney, Agent, or Firm* — Taft Stettinius & Hollister LLP

(57) ABSTRACT

A user interface display system associated with an electronic key that provides feedback to a user engaging the electronic lock, including a user interface display to depict to the user feedback patterns with each feedback pattern displayed to the user providing the feedback to the user as the user engages the electronic lock with the electronic key. Each displayed feedback pattern provides a corresponding color that is associated with the feedback provided to the user as the user engages the electronic lock with the electronic key. A controller transitions the electrochromic filter to each color to correspond with the feedback pattern that is displayed by the user interface display so that the transitioned color and the displayed feedback pattern is in response to the user engaging the electronic lock with the electronic key.

20 Claims, 12 Drawing Sheets

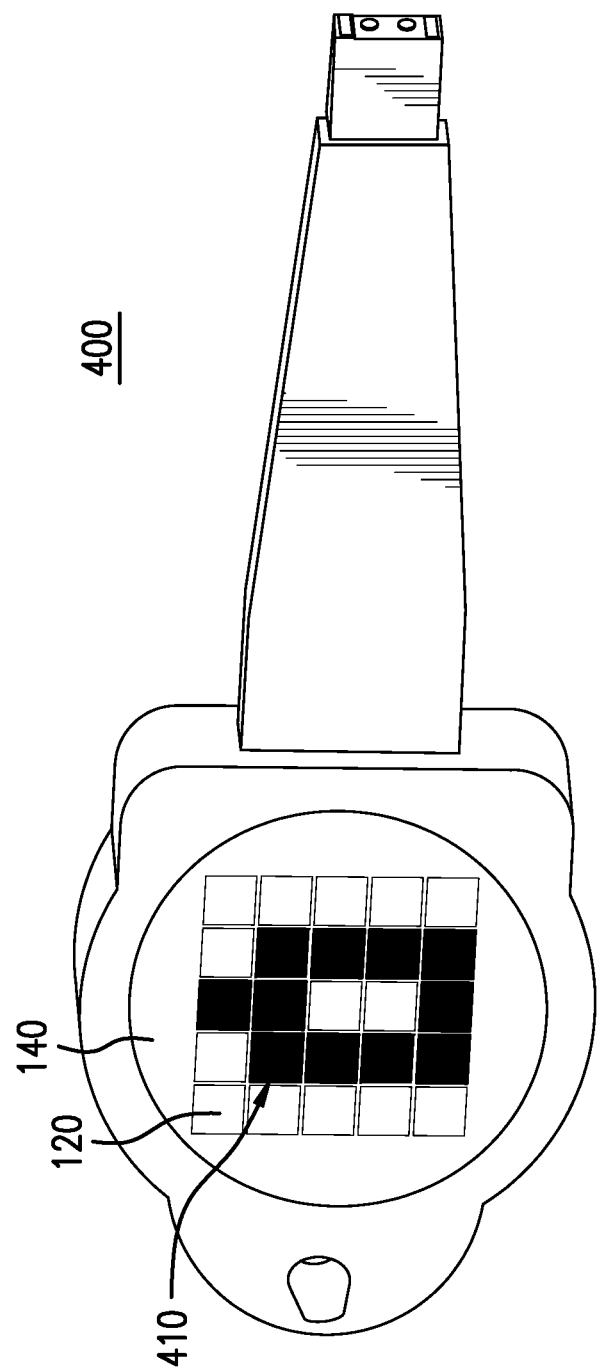

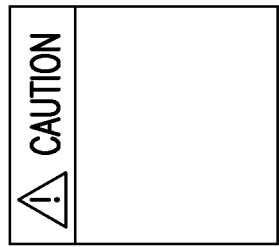
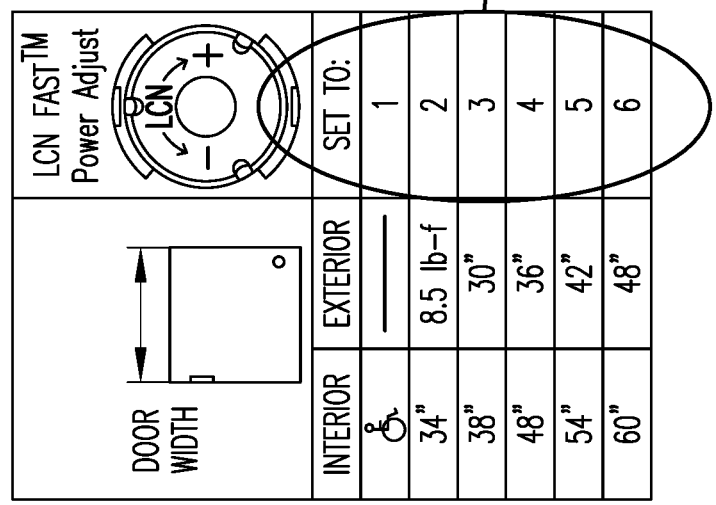
FIG. 8

ELECTROCHROMIC FILM FOR A USER INTERFACE DISPLAY FOR ACCESS CONTROL

BACKGROUND

Field of Disclosure

The present disclosure generally relates to user interface displays, and more specifically to an electrochromic colored filter enhancer for user interface displays associated with access control.

Related Art

Conventional user interface displays typically include light emitting diodes (LEDs) that are positioned in the conventional user interface display to provide feedback to the user as the user engages the conventional user interface display. With the advent of screen printed on film organic LEDs (OLEDs), the OLEDs are arranged in a conventional dot matrix pattern such that the necessary OLEDs emit light to provide the appropriate pattern to be displayed to provide feedback to the user. Typically, OLEDs are screen printed as monochromatic to decrease the cost in screen printing the OLEDs. The color of feedback displayed to the user is limited to the monochromatic color of the OLEDs and/or the filter positioned on the monochromatic OLEDs limiting the display of that filter to a single color. Thus, the flexibility of the feedback emitted by the monochromatic OLEDs is significantly limited for the conventional user interface display.

BRIEF SUMMARY

Embodiments of the present disclosure relate to incorporating an electrochromic filter into a user interface display system associated with access control to transition the colors displayed by the user interface display system as the user interface display system provides feedback to the user. In an embodiment, a user interface display system is associated with an electronic key that provides feedback to a user that is engaging an electronic lock with the electronic key. A user interface display is positioned on the electronic lock and is configured to depict to the user a plurality of feedback patterns with each feedback pattern that is displayed is in response to the user engaging the electronic lock with the electronic key. Each feedback pattern that is displayed to the user provides the feedback to the user as the user engages the electronic lock with the electronic key. An electrochromic filter is positioned on the electronic key and is configured to transition a color depicted by the user interface display to correspond to the feedback pattern depicted by the user interface display. Each feedback pattern that is displayed to the user provides a corresponding color that is associated with the feedback that is provided to the user as the user engages the electronic lock with the electronic key. A controller is configured to transition the electrochromic filter to each color to correspond with the feedback pattern that is depicted by the user interface display so that the transitioned color and the feedback pattern that is displayed is in response to the user engaging the electronic lock with the electronic key.

In an embodiment, a method provides feedback to a user that is engaging an electronic lock with an electronic key. A plurality of feedback patterns is depicted via a user interface display positioned on the electronic key with each feedback pattern that is displayed is in response to the user engaging the electronic lock with the electronic key. Each feedback pattern that is displayed to the user provides the feedback to the user as the user engages the electronic lock with the electronic key. A color depicted by the user interface display is transitioned via an electrochromic filter to correspond to the feedback pattern depicted by the user interface display. Each feedback pattern that is displayed to the user provides a corresponding color that is associated with the feedback that is provided to the user as the user engages the electronic lock with the electronic key. The electrochromic filter is transitioned to each color via a controller to correspond with the feedback pattern that is depicted by the user interface display so that the transitioned color and the feedback pattern that is displayed is in response to the user engaging the electronic lock with the electronic key.

In an embodiment, a user interface display system is positioned on a door closer that provides feedback to a user that is engaging the user interface display system of the door closer. A user interface display is configured to depict to the user a plurality of feedback patterns with each feedback pattern that is displayed is in response to the user engaging the user interface display system positioned on the door closer. Each feedback pattern that is displayed to the user provides the feedback to the user as the user engages the user interface display system of the door closer. An electrochromic filter positioned on the door closer and is configured to transition to a color depicted by the user interface display to correspond to the feedback pattern depicted by the user interface display. Each feedback pattern that is displayed to the user provides a corresponding color that is associated with the feedback that is provided to the user as the user engages the door closer. A controller is configured to transition the electrochromic filter to each color to correspond with the feedback pattern that is depicted by the user interface display so that the transitioned color and the feedback pattern that is displayed is in response to the user engaging the door closer.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number identifies the drawing in which the reference number first appears.

FIG. 4 depicts an elevational view of the example electronic key that includes the user interface display that emits a feedback pattern for a low battery level based on the electrochromic filter that is associated with the user interface display;

FIG. 8 depicts a block diagram of an example door closer setting configuration that depicts the different adjustment settings that the user may manually adjust the adjuster of the door closer to attain the corresponding force that the door associated with the door closer closes;

DETAILED DESCRIPTION OF THE PRESENT DISCLOSURE

Figure 1:
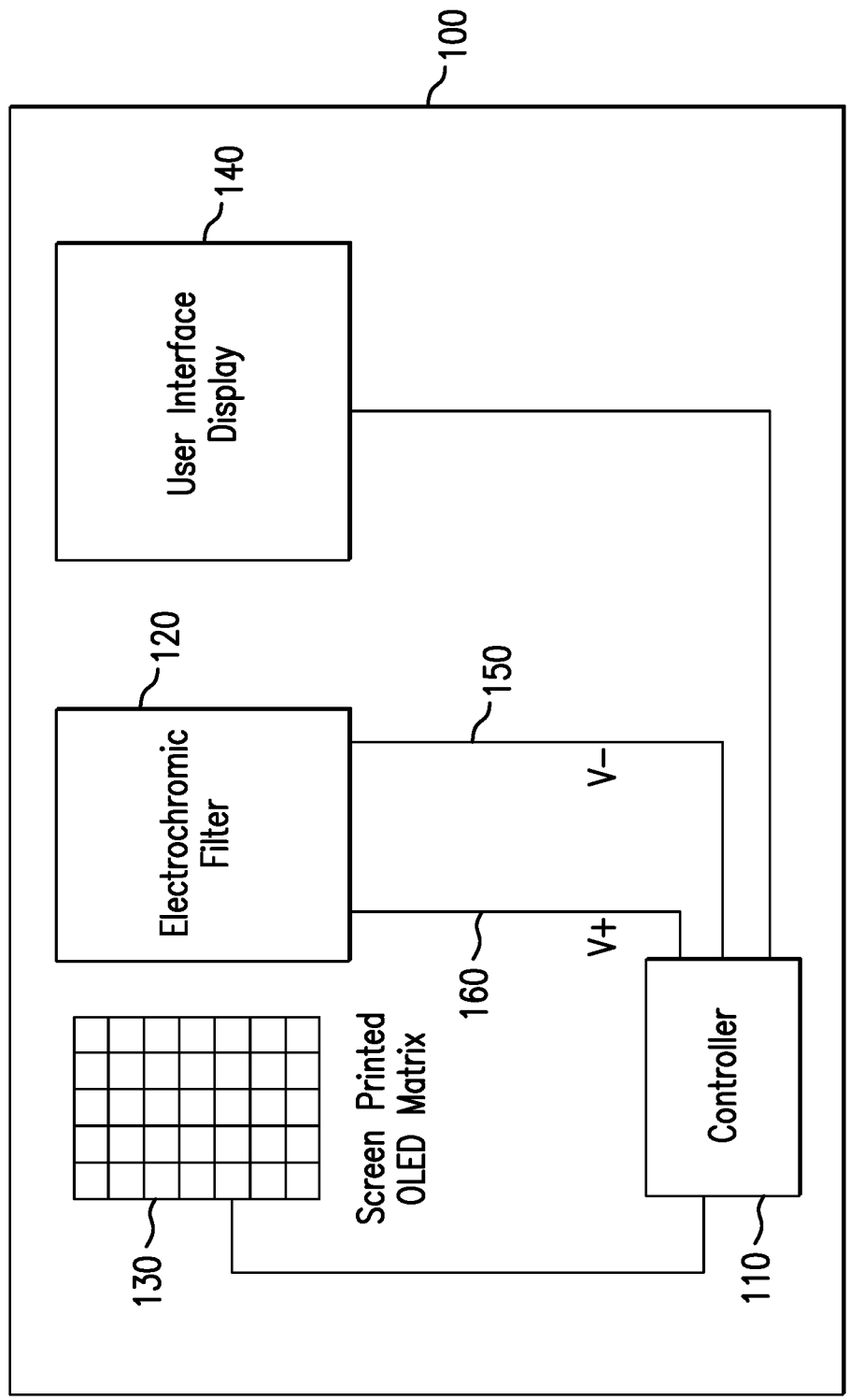
FIG. 1 is a block diagram of a visual feedback display system that displays visual feedback to a user as the user engages the visual feedback display system.

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

Electrochromic Visual Feedback Display System

FIG. 1 is a block diagram of a visual feedback display system 100 that displays visual feedback to a user as the user engages the visual feedback display system 100. For example, the visual feedback display system 100 may be associated with a key that enables the user to receive feedback as the user engages an access control device with the key in an attempt to obtain access to the space that is regulated by the access control device. The visual feedback display system 100 includes a user interface display 140, an electrochromic filter 120, a light source 130, and a controller 110.

The visual feedback display system 100 may be associated with a system that provides visual feedback to the user as the user engages the system. As the user engages the system, the visual feedback display system 100 may provide feedback to the user such that the user may have a better understanding of the status of the user in engaging the system. For example, the visual feedback display system 100 may be associated with the key that is required to engage an access control system that regulates the access that the user may have to a space. The user may engage the key to access the access control system in an attempt to gain access to the space that is regulated by the access control system. The feedback displayed by the visual feedback display system 100 may then provide the user with information that enables the user to have a better understanding of the status of the user engaging the access control system with the key. For example, the visual feedback display system 100 when associated with the key to engage the access control system may provide feedback to the user to enable the user to have a better understanding if the user is adequately engaging the access control system with the key to gain access to the space that the access control system is regulating.

The visual feedback display system 100 may provide feedback to the user that is attempting to engage a system with the key that includes but is not limited to access control systems that include but are not limited to door closers, door operators, auto-operators, credential readers, hotspot readers, electronic locks including mortise, cylindrical, and/or tabular locks, exit devices, panic bars, wireless reader interfaces, gateway devices, plug-in devices, peripheral devices, doorbell camera systems, door closer control surveillance systems and/or any other type of access control system that regulates access control to a space that will be apparent to those skilled in the relevant art(s) without departing from the spirit and scope of the disclosure.

Further, visual feedback display system 100 may provide feedback to the user that is attempting to engage any type of system where that engagement by the user with the system provides feedback to the user that is associated with the status of the user in engaging the system that may provide the user with a better understanding of the status of the user in engaging the system that will be apparent to those skilled in the relevant art(s) without departing from the spirit and scope of the disclosure. The key that the user engages the access control system with to access the space associated with the access control system and has the visual feedback display system 100 positioned on the key may include but is not limited to an electronic key, a key card, a mechanical key, and/or any other type of key that includes the visual feedback display system 100 that will be apparent to those skilled in the relevant art(s) without departing from the spirit and scope of the disclosure.

The visual feedback display system 100 may include the user interface display 140 that depicts to the user a plurality of feedback patterns with each feedback pattern that is displayed is in response to the user engaging the system. Each feedback pattern that is displayed to the user provides the feedback to the user as the user engages the system. As the user engages the system associated with the visual feedback display system 100, the user interface display 140 of the visual feedback display system 100 may depict feedback patterns to the user that correspond to the current status of the user in engaging the system associated with the visual feedback display system 100 thereby enabling the user to have feedback with regard to the current status of the user in engaging the system.

Figure 2:
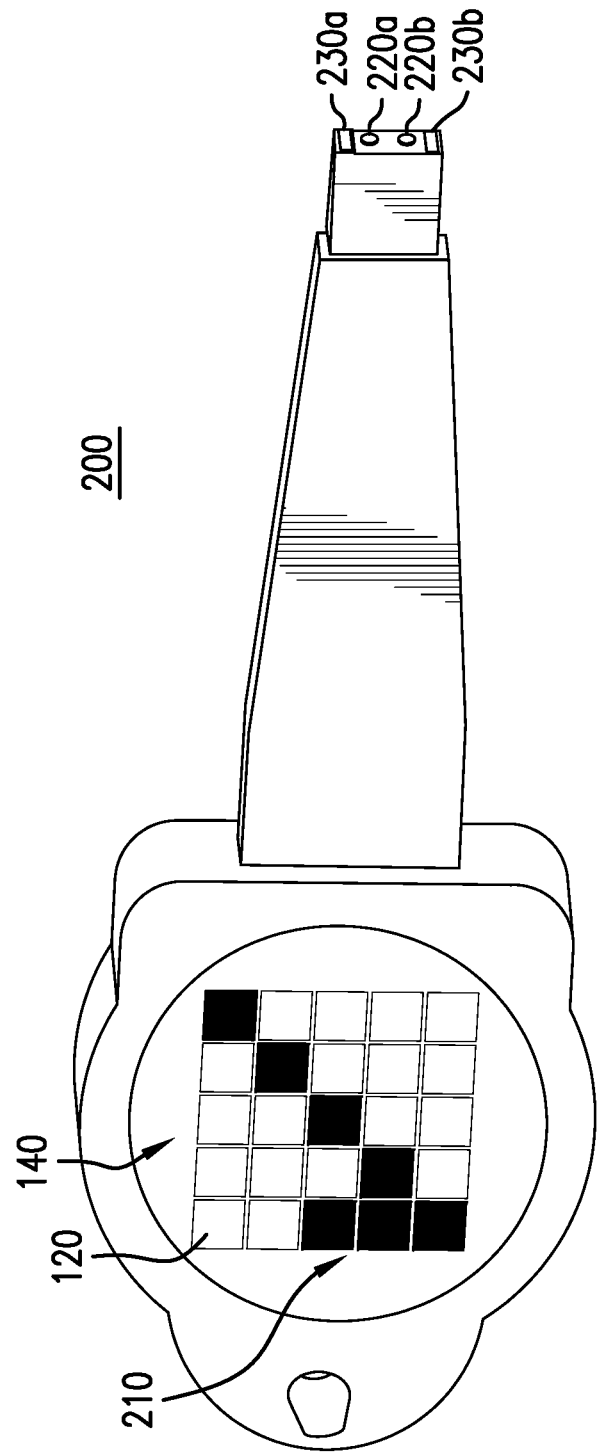
FIG. 2 depicts an elevational view of an example electronic key that includes a user interface display.

For example, FIG. 2 depicts an elevational view of an example electronic key 200 that includes the user interface display 140. As the user engages the electronic lock with the electronic key 200, the user interface display 140 may depict to the user different feedback patterns with each feedback pattern that is displayed is in response to the user engaging the electronic lock with the electronic key 200 such that each feedback pattern provides different information to the user regarding the status of the engagement of the electronic lock with the electronic key 200 by the user. In such an example, the user interface display 140 displays the feedback pattern 210 of a "green check mark" to the user indicating to the user that the user has provided the appropriate electronic key 200 to the electronic lock 200 and that the electronic lock is transitioning into an unlocked state to enable the user to have access to the space regulated by the electronic lock. The feedback pattern 210 displayed by the user interface display 140 may be any type of feedback pattern that provides information to the user as to the status of the user engaging the system associated with the user interface display system 100 that will be apparent to those skilled in the relevant art(s) without departing from the spirit and scope of the disclosure.

The user interface display 140 may include any type of display device include but not limited to a touch screen display, a liquid crystal display (LCD) screen, a dot matrix display, an Organic Light Emitting Diode (OLED) display, screen printed OLED matrix display and/or any other type of display device that includes a display that will be apparent from those skilled in the relevant art(s) without departing from the spirit and scope of the present disclosure.

The user interface display system 100 may include a light source 130 that is configured to emit a plurality of light patterns via the user interface display 140 to the user with each light pattern corresponding to each feedback pattern that is displayed in response to the user engaging the system associated with the user interface display system 100. As noted above, as the user engages the user interface display system 100, the user interface display 140 may emit feedback patterns that provide feedback to the user as to the current status of the user in engaging the system associated with the user interface display system 100. For each feedback pattern that is emitted by the user interface display 140, the light source 130 may generate a light pattern that corresponds to the feedback that is to be provided to the user in order to generate the feedback pattern emitted by the user interface display 140 thereby enabling the user to have feedback with regard to the current status of the user in engaging the system. In doing so, the controller 110 may instruct the light source 130 to emit each light pattern via the user interface display 140 to the user that corresponds to each feedback pattern that is displayed in response to the user engaging the system associated with the user interface display system 100.

Figure 3:
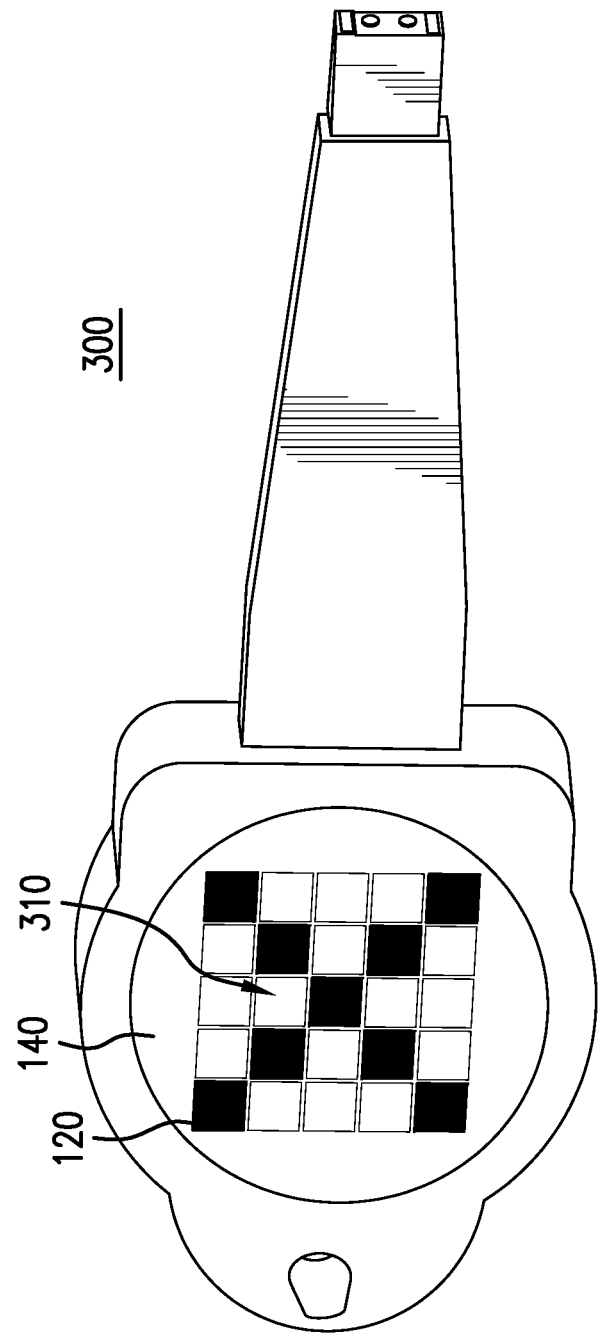
FIG. 3 depicts an elevational view of an example electronic key that includes a user interface display that emits a feedback pattern for a rejected credential based on the electrochromic filter that is associated with the user interface display.

For example, FIG. 3 depicts an elevational view of an example electronic key 300 that includes the user interface display 140 that emits feedback patterns with a corresponding color based on the electrochromic filter 120 that is associated with the user interface display 140. As the user engages the electronic lock 300, the user interface display 140 may depict to the user different feedback patterns 310 with each feedback pattern 310 that is displayed is in response to the user engaging the electronic key 300 such that each feedback pattern 310 provides different information to the user regarding the status of engagement of the electronic lock 300 by the user. In doing so, the controller 110 may instruct the light source 130 that is associated with the user interface display 310 to emit different light patterns with each light pattern corresponding to a different feedback pattern 310 that is displayed by the user interface display 140 to the user in response to the user engaging the electronic key 300.

In such an example, the user engages the electronic key 300 with an electronic lock. In response to the user providing the electronic key 300 with the incorrect credential associated with the electronic key 300, the controller 110 instructs the light source 130 that is associated with the user interface display 140 to emit a light pattern that depicts the "red X". The user interface display 140 then displays the feedback pattern 310 of the "red X" to the user indicating to the user that the user has provided an electronic key 300 with an incorrect credential associated with the electronic key 300 to engage the electronic lock and that the electronic lock is remaining in a locked state to prevent the user from having access to the space regulated by the electronic lock. The light pattern emitted by the light source 130 as instructed by the controller 110 and displayed by the user interface display 140 may be any type of feedback pattern that provides information to the user as to the status of the user engaging the system associated with the user interface display system 100 that will be apparent to those skilled in the relevant art(s) without departing from the spirit and scope of the disclosure.

The light source 130 may include any type of lighting configuration and not limited to a light emitting diode (LED) configuration, OLED configuration, dot matrix lighting configuration, an LCD lighting configuration, a screen printed OLED matrix configuration, and/or any other type of lighting configuration that includes a light source that will be apparent from those skilled in the relevant art(s) without departing from the spirit and scope of the present disclosure.

The electrochromic filter 120 may transition a color depicted by the user interface display 140 to correspond to the feedback pattern depicted by the user interface display 140. Each feedback pattern that is displayed to the user provides a corresponding color that is associated with the feedback that is provided to the user as the user engages the system associated with the user interface display system 100. The controller 110 may transition the electrochromic filter 120 to each color to correspond with the feedback pattern that is depicted by the user interface display 140 so that the transitioned color and the feedback pattern that is displayed is in response to the user engaging the system associated with the user interface display system 100. The controller 110 may control the optical properties of the electrochromic filter 120, such as but not limited to the optical transmission, absorption, reflectance, and/or emittance, in a continuous manner based on a voltage applied to the electrochromic filter 120 to transition the color of the electrochromic filter 120. In doing so, the optical properties of the electrochromic filter 120 may also be reversed to transition the color of the electrochromic filter 120 back to the original color when the controller 110 applies a different voltage to the electrochromic filter 120.

The electrochromic filer 120 may provide the user interface display system 100 with the flexibility to emit different colors associated with each feedback pattern. Rather than the user interface display 140 emit each different feedback pattern to the user in a single color, the electrochromic filter 120 may enable the user interface display system 100 to display each different feedback pattern in a color that corresponds to the feedback pattern to further enhance providing feedback to the user regarding the current status of the user in engaging the system associated with the user interface display system 100. For example, returning to FIG. 2, the user may provide the electronic key 200 that is associated with the appropriate credential to engage the electronic lock such that the electronic lock transitions to the unlocked state to enable the user to gain access to the space regulated by the electronic lock. In doing so, the controller 110 may instruct the light source 120 to emit a light pattern that corresponds to a feedback pattern 210 of a "check mark". Rather than simply displaying the light pattern in a monochromatic color such as "white", the controller 110 may instruct the electrochromic filter 120 to transition to the color "green" thereby providing additional feedback to the user in that the color "green" is typically associated with by the user as being "correct" and/or "authorized". Thus, the additional feedback of the color "green" further provides information to the user in addition to the feedback pattern 210 of the "check mark" that the user has adequately entered the correct access code and that the electronic lock has transitioned to the unlocked state thereby enabling the user to have access to the space regulated by the electronic lock.

In an embodiment, the user interface display system 100 may incorporate a screen printed OLED matrix display such that the light source 130 incorporates a screen printed OLED matrix configuration that then emits the light pattern via the user interface display 140 that incorporates the screen printed OLED matrix display. In doing so, the power consumed by the user interface display system 100 to emit each light pattern to correspond to each feedback pattern displayed by the user interface display 140 to the user may be decreased as compared to other conventional light sources such as dot matrix LED light configurations. Further, the overall thickness of the user interface display system 100 that incorporates the screen printed OLED matrix display may also be decreased as compared to other conventional light sources such as dot matrix LED light configurations due to the OLED matrix light source being screen printed to generate the screen printed OLED matrix display.

However, conventional user interface display systems that incorporate the screen printed OLED matrix display may be limited to emitting a single color with regard to the screen printed OLED matrix display. Typically, the screen printed OLED matrix display is limited to a single color such that once the OLED matrix light source is screen printed onto the conventional display system, such a screen printed OLED matrix display is limited to then emitting a single color for each feedback pattern that is displayed by the user interface display associated with the screen printed OLED matrix display. For example, a conventional user interface display that incorporates a screen printed OLED matrix light source that is a "white" color is then limited to displaying each feedback pattern in a "white" color. In such an example, such a conventional user interface display is limited to displaying both a feedback pattern of a "check mark" and a feedback pattern of a "X" in the single monochromatic color of "white" thereby limiting the feedback to the user.

Further in such an example, the conventional user interface display that then incorporates a screen printed OLED matrix light source that is a "green" color is then limited to displaying only feedback patterns where the user may easily correspond the "green" color with feedback that the user typically associates with as being "green". In doing so, the conventional user interface display is limited to displaying feedback patterns that are "affirmative" in nature such as the "check mark" that the user may easily associate with the "green" color. The user may become easily confused should the conventional user interface display then display the feedback pattern of the "X" in the "green" color as typically the user associates the feedback pattern of the "X" as "negative" in nature which conflicts with the "green" color which is typically associated by the user as being "affirmative" in nature. Thus, the conventional user interface display is limited in the feedback patterns that may be displayed via the conventional user interface display based on the color of the screen printed OLED matrix light source that is associated with the conventional user interface display.

In order for the conventional user interface display to have an increase in flexibility in the color that the conventional user interface display emits, the conventional user interface display is required to incorporate a dot matrix LED light source that includes multi-color LEDs. Each multi-color LED may emit a different color when instructed based on the feedback pattern that is to be emitted by the conventional user interface display. For example, the multi-color LEDs may transition between the color "green" when the conventional user interface display emits the "check mark" and then transition to emitting the color "red" when the conventional user interface display emits the "X". However, such multi-color LEDs consume significantly more power than the screen printed LED matrix light source as well as significantly increase the thickness of the conventional user interface display system. As a result, for many applications, that are battery operated and require a stringent physical footprint, such as an access control system, incorporating a multi-color LED dot matrix light source to provide the flexibility in emitting different colors to correspond to different feedback patterns is not feasible.

Thus, the electrochromic filter 120 may transition the color of the feedback pattern that is displayed by the user interface display 140 to correspond to the light pattern emitted by the light source 130 thereby providing the user interface display 140 with the flexibility to emit feedback patterns with a color that corresponds to the feedback pattern. The controller 110 may transition the electrochromic filter 120 to each color to correspond with the light pattern that is emitted by the light source 130 so that the transitioned color and the emitted light pattern that is displayed is in response to the user engaging the system associated with the user interface display system 100. For example, in FIG. 3, the controller 110 may instruct the electrochromic filter 120 to transition into different colors to correspond to the different feedback pattern that is displayed by the user interface display 140 to the user in response to the user engaging the electronic lock with the electronic key 300. In such an example, the controller 110 instructs the electrochromic filter 120 that is associated with the user interface display 140 to transition to the color "red" such that the user interface display 140 displays the feedback pattern 310 of the "red X" to the user indicating that the user has failed to provide the electronic key 300 with the appropriate credential associated with the electronic key 300 to engage the electronic lock and that the electronic lock is remaining in a locked state to prevent the user from having access to the space regulated by the electronic lock.

However, FIG. 410 depicts an elevational view of the example electronic key 400 that includes the user interface display 140 that emits a different feedback pattern 410 as well with a different color from FIG. 3 based on the electrochromic filter 120 that is associated with the user interface display 140. In such an example, the controller 110 is communicating that the power level of the battery associated with the electronic key 400 has decreased below a battery level threshold and is thus indicative that the battery associated with the electronic key 400 is low thereby triggering a different feedback pattern 410 to be emitted by the user interface display 140 to provide feedback to the user that corresponds to the power level of the battery being below the battery level threshold. In doing so, the controller 110 instructs the light source 130 to transition from emitting the light pattern of the "X" to the light pattern of the "low battery indicator" to provide to the user the feedback that the user that the power level of the battery associated with the electronic key 400 has decreased below the battery level threshold.

In doing so, the user interface display system 100 includes the flexibility to have different feedback patterns emitted by the user interface display 140 with the appropriate corresponding color to provide the appropriate feedback to the user without being limited to the user interface display 140 emitting a single feedback pattern that corresponds with a single color. For systems associated with the user interface display system 100 that may be battery operated, such as an access control system, user interface display system 100 may provide the flexibility with emitting different feedback patterns via the user interface display 140 that correspond to different colors provided by the electrochromic filter 120 while still incorporating the light source 130 as a screen printed OLED matrix. In doing so such systems that require decreased power consumption as well as a decreased physical footprint, such as the electronic key, may have an increased flexibility in the feedback patterns displayed to the user as well as an increased flexibility in the colors associated with the feedback patterns while maintaining decreased power consumption and a decreased physical footprint.

Electrochromic Filter

Figure 5A:
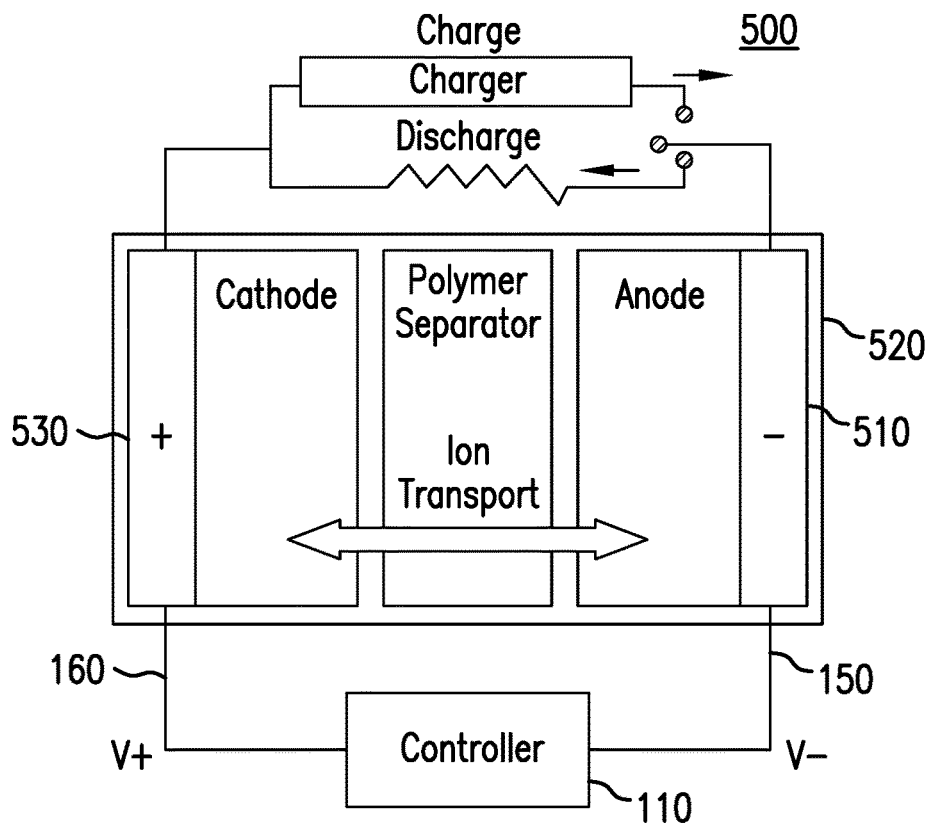
FIG. 5A is a schematic view of an electrochromic filter configuration that is associated with a user interface display system.
Figure 5B:
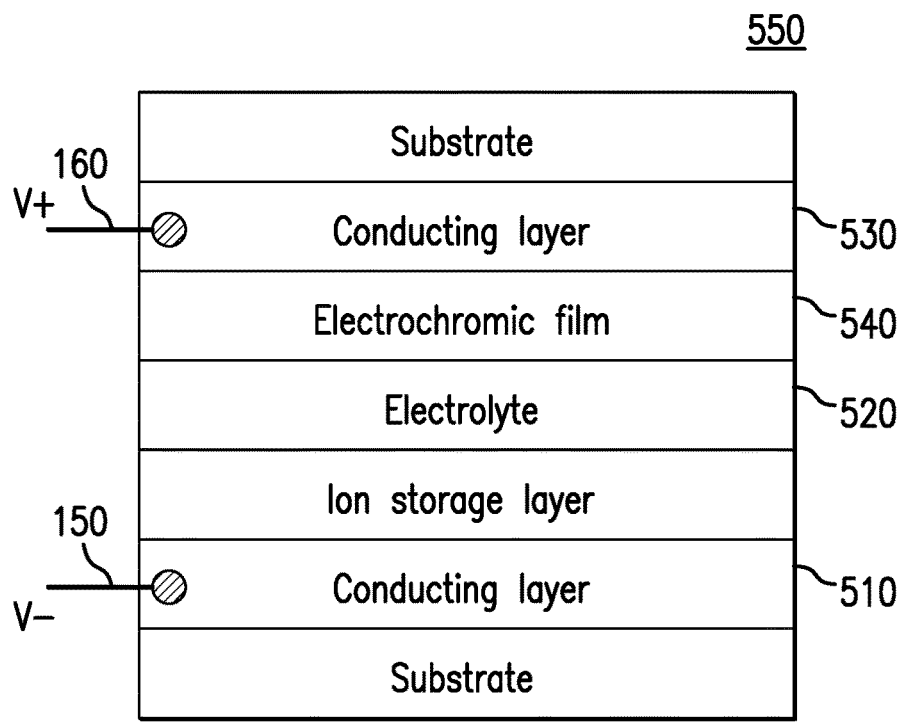
FIG. 5B is a schematic view of an electrochromic filter configuration that depicts a layering view of the electrochromic filter depicted in FIG. 5A.

FIG. 5A is a schematic view of an electrochromic filter configuration 500 that is associated with a user interface display system. The electrochromic filter configuration 500 transitions between colors as instructed by the controller 110 based on a negative voltage 150 that is applied to the electrochromic filter 520 by the controller 110 and a positive voltage 160 that is applied to the electrochromic filter 520. The electrochromic filter configuration 500 includes the controller 110, an electrochromic filter 520, a negative conducting layer 510, and a positive conducting layer 530. FIG. 5B is also a schematic view of an electrochromic filter configuration 550 that depicts a layering view of the electrochromic filter 520 depicted in FIG. 5A. The electrochromic filter configuration 550 includes the negative conducting layer 510 that the controller 110 applies the negative voltage 150, the positive conducting layer 530 that the controller 110 applies the positive voltage 160, and an electrochromic film 540. The electrochromic filter configurations 500 and 550 share many similar features with the user interface display systems 100, 200, 300, and 400; therefore, only the differences between the electrochromic filter configurations 500 and 550 and the user interface display systems 100, 200, 300, and 400 are to be discussed in further detail.

The electrochromic filter 520 includes the negative conducting layer 510, the positive conducting layer 530, and the electrochromic film 540. The electrochromic film 540 includes electrochromic materials that are bi-stable in that when the controller 110 applies the positive voltage 160 to the positive conducting layer 530, the electrochromic film 540 transitions from an active state in that the electrochromic film 540 is in a color state to an inactive state in that the electrochromic film 540 is in a clear state. The electrochromic film 540 then transitions from the inactive state in that the electrochromic filter 530 is in the clear state to an active state in that the electrochromic filter 530 is in the color state when the controller 110 applies the negative voltage 150 to the negative conducting layer 510. In being bi-stable, the electrochromic film 540 may remain in its current state after the controller 110 applies the positive voltage 160 and/or the negative voltage 150 until the controller 110 applies a different voltage triggering the electrochromic film 540 to change from its current state.

For example, the electrochromic film 540 may remain inactive in the clear state in that the electrochromic filter 530 is clear thereby enabling the user interface display 140 to emit the color of the light source 130 until the controller 110 applies the negative voltage 150 to the negative conducting layer 510. The electrochromic film 540 may then activate and transition to the colored state when the controller 110 applies the positive voltage 160 to the positive conducting layer 530 thereby enabling the user interface display 140 to emit the color of the electrochromic film 160 when activated in the colored state until the controller 110 applies the positive voltage 160 to the positive conducting layer 530 and in doing so inactivating the electrochromic film 530 and transitioning the electrochromic film 530 back into the clear state.

The controller 110 may activate the electrochromic filter 520 and transition the electrochromic filter 520 into the colored state when the controller 110 applies the negative voltage 150 to the negative conducting layer 510. In applying the negative voltage 150 to the negative conducting layer 510, a discharge of the electrochromic filter 520 is triggered from the reduction oxidation of the electro potential between the cathode and the anode thereby activating the optical properties of the electrochromic film 530 to transition the electrochromic film 530 into the colored state such that the user interface display 140 emits the color of the electrochromic film 530. In applying the positive voltage 160 to the positive conducting layer 530, a charge of the electrochromic filter 520 is triggered from the reoxidation reaction of the electro potential between the cathode and the anode thereby deactivating the optical properties of the electrochromic film 530 to transition the electrochromic film 530 into the clear state such that the user interface display 140 emits the color of the light source 130.

In doing so, the electro potential of the electrochromic filter 520 may be triggered with a decreased voltage applied by the controller 110 whether the controller 110 applies the negative voltage 150 or the positive voltage 160 to the electrochromic filter 520. The electrochromic filter 520 may then activate into the colored state when the controller 110 applies a decreased negative voltage 150 and may remain in that state until a decreased positive voltage 160 is applied. The electrochromic filter 520 may then deactivate into the clear state when the controller 110 applies a decreased positive voltage 160 and may remain in that state until a decreased negative voltage 150 is applied. Thus, the electrochromic filter 520 may transition colors of the feedback pattern displayed by the user interface display 140 and may maintain the displayed color while consuming decreased power. In an embodiment, the electrochromic filter 520 may be activated into the colored state and may maintain the colored state or deactivated into the clear state and may maintain the clear state when the controller 110 applies the negative voltage 150 and/or the positive voltage 160 of 1V or less.

Electrochromic Visual Feedback Display System Associated with an Electronic Key

Returning to FIG. 2, the electronic key 200 may include the user interface display 140 and depict to the user various feedback patterns, such as feedback pattern 210, via the light source 130. In doing so, the user may receive the appropriate feedback from the user engaging the electronic lock with the electronic key 200 based on the feedback patterns displayed to the user via the user interface display 140. In doing so, the electronic lock may be a less sophisticated lock in that the electronic lock does not require the user interface display. Rather, the electronic lock may communicate with the electronic key 200 via the communication lines 220(*a-b*) such that the controller 110 of the electronic key 200 may then instruct the user interface display 140 to display the appropriate feedback pattern to the user based on the communication provided by the electronic lock thereby eliminating the requirement of the electronic lock to have a user interface display.

The electronic key 200 may include the communication lines 220(*a-b*) such that data may be communicated between the electronic key 200 and the electronic lock. The electronic key 200 may transmit data to the electronic lock regarding the credential that is associated with the user of the electronic key 200 via the communication lines 220(*a-b*). The electronic lock may transmit data to the electronic key 200 regarding the appropriate feedback patterns that the user interface display 140 is to depict to the user based on the status of the user engaging the electronic lock via the electronic key 200 provided by the credential. The electronic key 200 may also include power contacts 230(*a-b*) such that the power may be propagated between the electronic key 200 and the electronic lock. In doing so, the electronic lock may propagate power via the power contacts 230(*a-b*) to the electronic key 200 such that the electronic key 200 powers the electronic lock thereby having the primary battery source positioned on the electronic key 200. Further, the electronic lock may propagate power to the electronic key 200 via power contacts 230(*a-b*) such that the appropriate voltage pulses to adjust the electrochromic filter 120 positioned on the electronic key 200 may be transmitted via the power contacts 230(*a-b*) such that the electrochromic filter 120 transitions to display the appropriate feedback pattern to the user. In doing so, the primary battery source may be positioned on the electronic lock.

The controller 110 may communicate with the electronic lock to determine whether a credential associated with the electronic key is accepted by the electronic lock. The electronic key 200 may include a credential that is associated with the user of the electronic key 200 such that the credential when analyzed by the controller 110 may determine whether the user associated with the electronic key may be granted access to the space associated with the electronic lock. The user may be assigned a credential and the credential may be programmed into the controller 110 of the electronic key 200. The credential assigned to the user and programmed into the controller 110 of the electronic key 200 may provide the appropriate access that the user is to be granted to various spaces associated with electronic locks. The user may then engage the electronic lock with the electronic key 200 such that the communication lines 220 (*a-b*) engage the electronic lock and communication is established between the electronic key 200 and the electronic lock. The controller 110 may then communicate to the electronic lock the credential associated with the user of the electronic key 200 via the communication lines 220(*a-b*).

The controller 110 may then transition the electrochromic filter 120 to display an accepted feedback pattern 210 that is depicted by the user interface display 140 when the credential associated with the electronic key 200 is accepted by the electronic lock. The accepted feedback pattern 210 communicates to the user that the credential associated with the electronic key 200 is accepted by the electronic lock. After the controller 110 has communicated to the electronic lock the credential associated with the user of the electronic key 200, the electronic lock may determine whether the user may be granted access to the space associated with the electronic lock based on the credential provided by the controller 110 of the electronic key 200. The electronic lock may then communicate via communication lines 220(*a-b*) that the user is to be granted access to the space associated with the electronic lock based on the credential of the user of the electronic key and that the electronic lock may transition from the locked state to the unlocked state. The controller 110 may then transition the electrochromic filter 120 to display the accepted feedback pattern 210 such that the user interface display 140 may provide the appropriate feedback to the user that the credential has been accepted and that the electronic lock is transitioning from the locked state to the unlocked state.

The controller 110 may transition the electrochromic filter 120 to display a rejected feedback pattern 310 that is depicted by the user interface display 140 of the electronic key 300 as shown in FIG. 3 when the credential associated with the electronic key 300 is rejected by the electronic lock. The rejected feedback pattern may communicate to the user that the credential associated with the electronic key 300 is rejected by the electronic lock. After the controller 110 has communicated to the electronic lock the credential associated with the user of the electronic key 300, the electronic lock may determine whether the user may be granted access to the space associated with the electronic lock based on the credential provided by the controller 110 of the electronic key 300. The electronic lock may then communicate via communication lines 220(a-b) that the user is denied access to the space associated with the electronic lock based on the credential of the user of the electronic key and that the electronic lock may remain in the locked state. The controller 110 may then transition the electrochromic filter 120 to display the rejected feedback pattern 310 such that the user interface display 140 may provide the appropriate feedback to the user that the credential has been denied and that the electronic lock is remaining in the locked state.

Power contacts 230(a-b) may be positioned on the electronic key 200 and may receive power from the electronic lock when the electronic key 200 is inserted into the electronic lock so that the power contacts 230(a-b) engage a power source associated with the electronic lock. The power received from the electronic lock is provided to the controller 110 and the user interface display 140 to power the controller 110 and the user interface display 140 when the power contacts 230(a-b) engage the power source associated with the electronic lock. The power contacts 230(a-b) may enable the electronic key 200 to engage the power source of the electronic lock and in turn rely on the power source of the electronic lock as the primary power source. In doing so, the power source positioned on the electronic key 200 may require significantly less capacity than the power source of the electronic lock thereby enabling the cost of the electronic key 200 to be decreased due to the decreased capacity of the power source positioned on the electronic key 200 or the elimination of a need for a power source positioned on the electronic key 200 altogether.

In such an embodiment, the controller 110 may be powered by the power source associated with the electronic lock when the power contacts 230(a-b) engage the power source associated with the electronic lock. The controller 110 may then instruct the user interface display 140 as to the appropriate feedback pattern to display to the user based on the engagement of the user with the electronic lock via the electronic key 200. However, rather than the controller 110 providing the appropriate voltage pulses to transition the electrochromic filter 120 positioned on the electronic key to depict the appropriate feedback pattern, the controller 110 may instruct the power source of the electronic lock to pulse the appropriate voltage pulses to transition the electrochromic filter 120 via the power contracts 230(a-b). In doing so, the power source associated with the electronic lock may provide the appropriate voltage pulses to the electrochromic filter 120 via the power contacts 230(a-b) such that the user interface display 140 depicts the appropriate feedback pattern to the user.

A power source positioned on the electronic key 200 may provide power to the electronic lock when the electronic key 200 is inserted into the electronic lock so that the power contacts 230(a-b) engage the power source associated with the electronic lock. The power received from the power source positioned on the electronic key 200 is provided to the power source associated with the electronic lock when the power contacts 230(a-b) engage the power source associated with the electronic lock. The power contacts 230(a-b) may enable the electronic lock to engage the power source of the electronic key 200 and in turn rely on the power source of the electronic key 200 as the primary power source. In doing so, the power source positioned on the electronic lock may require significantly less capacity than the power source of the electronic lock thereby enabling the cost of the electronic lock to be decreased due to the decreased capacity of the power source positioned on the electronic lock or the elimination of a need for a power source positioned on the electronic lock altogether.

For example, the electronic lock may determine that the credential provided by the controller 110 of the electronic key 200 authorizes the user to have access to the space associated with the electronic lock. The power source positioned on the electronic key 200 may then be provided to the electronic lock via the power contacts 230(a-b). In doing so, the controller 110 of the electronic key 200 may pulse the voltage generated by the power source positioned on the electronic key 200 to a motor positioned in the electronic lock via the power contacts 230(a-b). The motor may then drive a pin into a clutch positioned in the electronic lock based on the power provided from the electronic key 200 via the power contacts 230(a-b) to then enable the user to manually transition the deadbolt from the locked state to the unlocked state.

The communication lines 220(a-b) and the power contacts 230(a-b) may enable the flexibility to have the primary controller 110 positioned on the electronic key 200 such that the controller 110 continues to control the user interface display 140 and/or the electrochromic filter 120 as positioned on the electronic key 200. The controller 110 as positioned on the electronic key 200 may also be the primary controller 110 for the electronic lock such that the controller 110 instructs the electronic lock 110 as to how to operate. In doing so, the primary power source may be positioned on the electronic key 200 and may power the controller 110 to transition the electrochromic filter 120 and to instruct the user interface display 140 to display the appropriate feedback patterns as well as be the primary source for the electronic lock. However, the primary power source may also be positioned on the electronic lock and may power the controller 110 and the user interface display 140 and to provide the voltage pulses to transition the electrochromic filter 120. The primary controller 110 may also be positioned on the electronic lock such that the controller 110 controls the user interface display 140 and/or the electrochromic filter 120 as positioned on the electronic lock. The communications lines 220(a-b) and the power contacts 230(a-b) enable the flexibility to have the primary controller 110 and/or the primary power source positioned on the electronic key 200, the electronic lock, and/or any combination thereof that will be apparent to those skilled in the relevant art(s) without departing from the spirit and scope of the disclosure.

Electrochromic Visual Feedback Display System Associated with a Mechanical Key

Figure 6B:
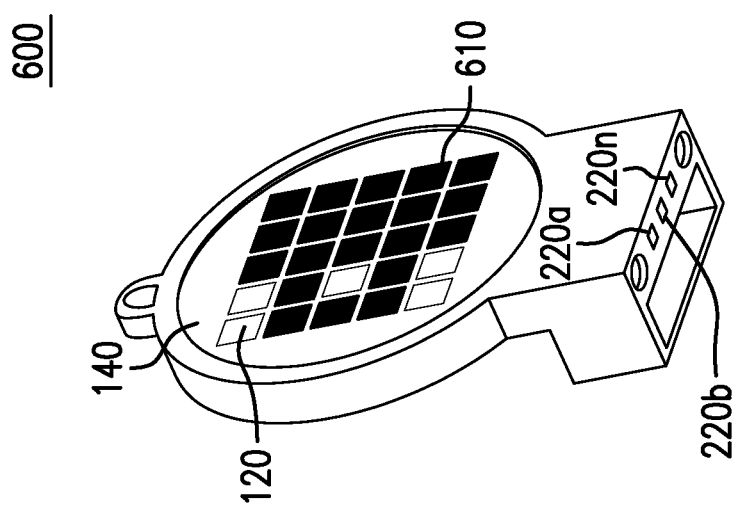
FIG. 6B depicts an elevational view of an example user interface display system positioned on a mechanical key.
Figure 6A:
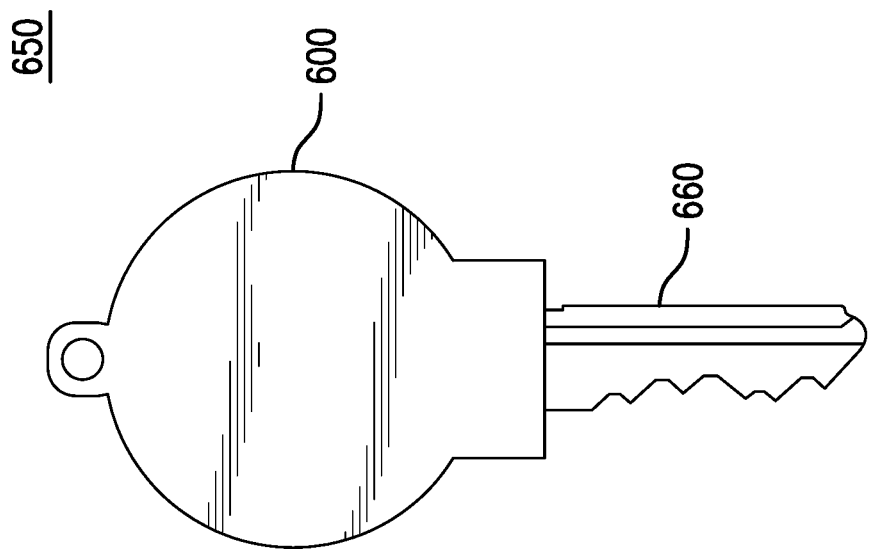
FIG. 6A depicts an elevational view of an example user interface display system for a mechanical key that includes a user interface display that emits feedback patterns based on an electrochromic filter.

FIGS. 6A and 6B depict an elevational view of a portable user interface display 600 that is incorporated with a mechanical key 660 thereby forming the portable user interface display system 650 that is associated with a mechanical key and a corresponding mechanical lock.

Rather than being associated with an electronic key and a corresponding electronic lock as discussed in detail above, the portable user interface display 600 enables a user interface display 140 to be incorporated into the mechanical key 660 such that the electrochromic filter 120 is transitioned accordingly to display the appropriate feedback pattern to the user via the user interface display 140. In doing so, the features discussed in detail above in depicting the appropriate feedback pattern to the user via the transitioning of the electrochromic filter 120 may be provided to the user engaging the mechanical lock with the mechanical key 660. The mechanical key is a key that is patterned to engage a corresponding mechanical lock that is patterned to receive the mechanical key. The mechanical lock then transitions from the locked state to the unlocked state when the appropriate mechanical key with the appropriate pattern is inserted into the mechanical lock that is patterned to receive the mechanical key with the appropriate pattern and the user then manually rotates the mechanical key to transition the mechanical lock from the locked state to the unlocked state.

A portable user interface display system 600 may be positioned on a mechanical lock 660. The user interface display system 600 may provide a user interface 140 that may be positioned on the portable user interface display system 600 and may depict to the user feedback patterns in response to the user engaging an adaptable mechanical lock with the mechanical key 660. The portable user interface display system may be removable from the mechanical key 660. The portable user interface display system 600 may provide an electrochromic filter positioned on the portable user interface display 600 and may transition to a color depicted by the user interface 140 as the user engages the adaptable mechanical lock with the mechanical key 660. The adaptable mechanical lock is a mechanical lock that is adapted to engage the portable user interface display system 600. The portable user interface display system 600 may provide a controller 110 positioned on the portable user interface display system 600 and may transition the electrochromic filter 120 to each color to correspond with the feedback pattern that is depicted by the user interface display 140 in response to the user engaging the adaptable mechanical lock with the mechanical key 660.

The portable user interface display system 600 may engage with the adaptable mechanical lock via communication lines 220(*a-n*). The communication lines 220(*a-n*) of the portable user interface display system 600 may engage corresponding communication lines of the adaptable mechanical lock to enable communication between the portable user interface display system 600 and the adaptable mechanical lock. The portable user interface display system 600 may engage with the adaptable mechanical lock via a plurality of power contacts. The power contacts of the portable user interface display system 600 may engage a plurality of corresponding power contacts of the adaptable mechanical lock to enable power to be provided between the portable user interface display system 600 and the adaptable mechanical lock.

The portable user interface display system 600 may engage the adaptable mechanical lock such that the adaptable mechanical lock may communicate with the portable user interface display system 600 such that the portable user interface display system 600 may then provide to the user the appropriate feedback patterns as the user engages the adaptable mechanical lock with the mechanical key 660. For example, the controller 110 positioned on the portable user interface display system 600 may communicate with the adaptable mechanical lock via the communication lines 220(*a-n*) and may determine from the adaptable mechanical lock whether the mechanical key 660 has successfully been inserted into the adaptable mechanical lock and whether the user has successfully rotated the mechanical key 660 thereby transitioning the adaptable mechanical lock from the locked state to the unlocked state. The communication lines 220(*a-n*) of the portable user interface display system 600 may engage the corresponding communication lines of the adaptable mechanical lock. The adaptable mechanical lock may generate a signal when the bolt associated with the adaptable mechanical lock has transitioned from the locked state to the unlocked state.

The controller 110 positioned on the portable user interface display system 600 may monitor the communication lines 220(*a-n*) for the signal generated by the adaptable mechanical lock that indicates that the bolt associated with the adaptable mechanical lock has transitioned from the locked state to the unlocked state. The adaptable mechanical lock may generate the signal indicating that the adaptable mechanical lock has transitioned to the unlocked state when the mechanical key 660 is successfully inserted into the adaptable mechanical lock and the pattern of the mechanical key 660 corresponds to the pattern of the adaptable mechanical lock thereby enabling the bolt to transition from the locked state to the unlocked state. The controller 110 may then transition the electrochromic filter 120 positioned on the portable user interface display system 600 to depict the feedback pattern of the "check mark" when the controller 110 detects the signal via the communication lines 220(*a-n*) that the bolt associated with the adaptable mechanical lock has transitioned to the unlocked state. In doing so, the user interface display 140 positioned on the portable user interface display system 600 may depict the feedback pattern of the "check mark" and thereby provide to the user the feedback that the adaptable mechanical lock has been transitioned to the unlocked state and the user may access the space associated with the adaptable mechanical lock.

In another example, the controller 110 may communicate with the adaptable mechanical lock via the communication lines 220(*a-n*) and may determine from the adaptable mechanical lock that the mechanical key 660 that has been inserted into the adaptable mechanical lock has failed to successfully transition the adaptable mechanical lock from the locked state to the unlocked state. The adaptable mechanical lock may determine when the mechanical key 660 has been inserted into the adaptable mechanical lock. The adaptable mechanical lock may then determine that the pattern of the mechanical key 660 fails to correspond to the adaptable mechanical lock in that the bolt associated with the adaptable mechanical lock has failed to transition from the locked state to the unlocked state. The adaptable mechanical lock may then generate a signal that indicates that the mechanical key 600 has failed to transition the bolt from the locked state to the unlocked state. The controller 110 may monitor the communication lines 220(*a-n*) and determine that the mechanical key 660 has failed to transition the bolt from the locked state to the unlocked state when the controller 110 identifies such a signal generated by the adaptable mechanical lock. The controller 110 may then transition the electrochromic filter 120 to depict the feedback pattern of the "X" such that the user interface display 140 may provide to the user the feedback that the adaptable mechanical lock has failed to transition from the locked state to the unlocked state and the user is prohibited from accessing the space associated with the adaptable mechanical lock.

In another example, the adaptable mechanical lock may generate a signal when the bolt associated with the adaptable mechanical lock is in the locked state. The controller 110 may then monitor the communication lines 220(*a-n*) when the adaptable mechanical key 660 is inserted into the adaptable mechanical lock and the communication lines 220(*a-n*) engage the corresponding communication lines of the adaptable mechanical lock. The controller 110 may then determine that the adaptable mechanical lock has generated the signal indicating that that the bolt associated with the adaptable mechanical lock is currently in the locked state. The controller 110 may then transition the electrochromic filter 120 to depict to the feedback pattern 610 of a "lock" such that the user interface display 140 may provide to the user the feedback that the adaptable mechanical lock is currently in the locked state.

The controller 110 may also monitor aspects of the portable user interface display system 600 and provide feedback to the user associated with the portable user interface display system 600. For example, the controller 110 may monitor the battery level of the battery associated with the portable user interface display system 600 and may determine whether the battery level of the battery associated with the portable user interface display system 600 has decreased below the battery level threshold. In such an example, the controller 110 may transition the electrochromic filter 120 to depict the feedback pattern of the "low battery" such that the user interface display 140 may provide to the user the feedback that the battery level of the battery associated with the portable user interface display system 600 has decreased below the battery level threshold.

Electrochromic Visual Feedback Display System Associated with a Door Closer

Figure 7:
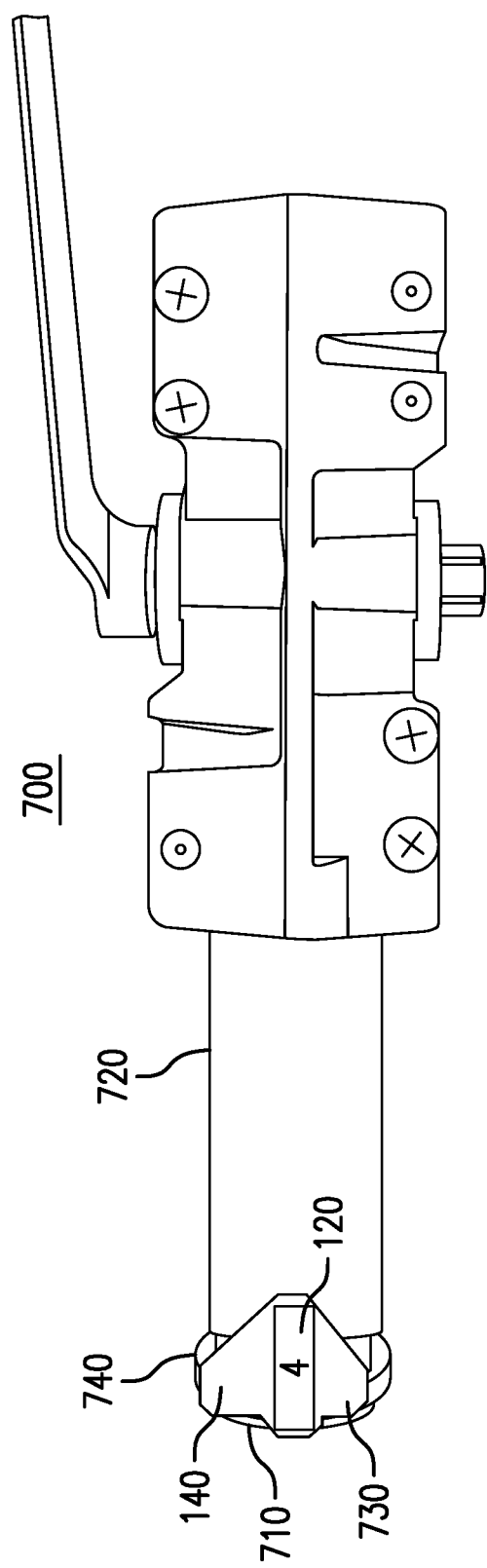
FIG. 7 depicts an elevational view of an example user interface display system that is associated with a door closer that emits feedback patterns based on an electrochromic filter.

FIG. 7 depicts an elevational view of a user interface display door closer configuration 700 such that a user interface display system 730 is positioned on a door closer 720. The door closer may include several different adjustment settings in that each adjustment setting corresponds to an amount of force in which the door associated with the door closer may close. The user interface display system 730 may depict to the user an adjustment setting feedback pattern 710 that provides the user with the feedback as to the adjustment setting that the door closer 720 is currently set. The controller 110 included in the user interface display system 730 may transition the electrochromic filter 120 included in the user interface display system 730 to depict the appropriate adjustment setting feedback pattern 710 such that the user interface display 140 may display the appropriate adjustment setting feedback pattern 710 to the user. The user may then have the feedback as to the current adjustment setting of the door closer 720.

The door closer 720 includes an adjuster 740 such that the user is required to manually shift the adjuster 740 with a wrench to adjust the adjustment setting of the door closer 720. The adjustment setting corresponds to an amount of force that when the adjuster 740 is manually adjusted to the adjustment setting by the user, the door associated with the door closer 720 then closes at the amount of force that corresponds to the adjustment setting that the door closer 720 is currently set. The user may manually adjust the adjuster 740 to adjust the adjustment setting to decrease and/or increase the amount of force that the door associated with the door closer 720 closes. For example, as shown in FIG. 8, a door closer setting configuration 800 depicts the different adjustment settings that the user may manually adjust the adjuster 740 of the door closer 720 to attain the corresponding force that the door associated with the door closer 720 closes with. In such an example, the adjuster 740 may be manually adjusted by the user to attain the adjustment settings of "1", "2", "3", "4", "5", and "6". Each of the different adjustment settings correspond to a different force in which the door associated with the door closer 720 closes with when the adjuster 740 is set to the corresponding adjustment setting. Thus, the user may manually adjust the adjuster 740 to each of the adjustment settings of "1", "2", "3", "4", "5", and "6" to increase and/or decrease the amount of force that the door associated with the door closer 720 closes.

The controller 110 included in the user interface display system 730 may determine an adjustment setting associated with the door closer 720 is set. The adjustment setting associated with the door closer 720 corresponds to the amount of force that the door closer 720 is set to apply to a door associated with the door closer 720. The controller 110 may transition the electrochromic filter 120 to display an adjustment setting feedback pattern 710 that is depicted by the user interface display 140 that corresponds to the adjustment setting that the door closer 720 is set. The adjustment setting feedback pattern 710 provides feedback to the user as to the adjustment setting that the door closer 720 is set. For example, as shown in FIG. 7, the controller 110 determines that the adjustment setting of the door closer 720 is currently at the adjustment setting of "4". The controller 110 then transitions the electrochromic filter 120 to depict the adjustment setting feedback pattern 710 of "4" such that the user interface display 140 displays to the user the adjustment setting feedback pattern 710 of "4". In doing so, the user may easily identify that the current adjustment setting of the door closer 720 is the adjustment setting of "4".

The controller 110 may determine the adjustment setting associated with the door closer 720 as the user adjusts the adjustment setting. The controller 110 may transition the electrochromic filter 120 to adjust the adjustment setting feedback pattern 710 that is depicted by the user interface display 140 to correspond to the adjusted adjustment setting of the door closer 720 as adjusted by the user to provide feedback to the user as to the adjusted adjustment setting that the door closer 720 is set. As the user adjusts the adjustment setting associated with the door closer 720, the controller 110 may automatically determine the change in the adjustment setting and then automatically transition the electrochromic filter 120 to depict the current adjustment setting that has changed as the user adjusts the adjustment setting. The automatic determination of the adjustment setting by the controller 110 and then the automatic transitioning of the electrochromic filter 120 by the controller 110 to depict the current adjustment setting enables the current adjustment setting feedback pattern 710 to be displayed to the user via the user interface display 140. In doing so, the user may receive feedback as to the current adjustment setting of the door closer 720 as the user adjusts the adjustment setting. The user may determine whether the user is required to continue to increase and/or decrease the adjustment setting based on the current adjustment setting feedback pattern 710 displayed to the user as the user adjusts the adjustment setting.

For example, the adjustment setting of the door closer 720 may currently be set at the adjustment setting of "4". The controller 110 may ensure that the electrochromic filter 120 depicts the adjustment setting feedback pattern 710 of "4" such that the user may easily identify that the current adjustment setting of the door closer 720 is at the adjustment setting of "4". As the user increases the adjustment setting to the adjustment setting of "5", the controller 110 may automatically determine that the adjustment setting of the door closer 720 has increased from "4" to "5". The controller 110 may then transition the electrochromic filter 120 to depict the adjustment setting of "5" such that the user interface display 140 displays to the user the adjustment setting feedback pattern 710 of "5" rather than the previous adjustment setting of "4". The user may then determine whether the user is required to continue to increase and/or decrease the adjustment setting based on the current adjustment setting feedback pattern 710 displayed to the user by the user interface display 140.

The controller 110 may adjust a voltage applied to a contact 850(a-n) from a plurality of contacts 850(a-n), where n is an integer that equals the amount of different adjustment setting feedback patterns 810(a-n) that may be displayed by the user interface display 140, such that each of the contacts 850(a-n) corresponds to an adjustment setting feedback pattern 810(a-n) that is depicted by the user interface display 140. In doing so, each of the contacts 850(a-n) correspond to the adjustment setting that the door closer 720 is set. The controller 110 may transition the electrochromic filter 120 to transition such that the adjustment setting feedback pattern 810(a-n) is displayed by the user interface 140 when the voltage applied to the contract 850(a-n) that corresponds to the adjustment setting feedback pattern 810(a-n) to depict to the user the adjustment setting that the door closer 720 is set.

Figure 9:
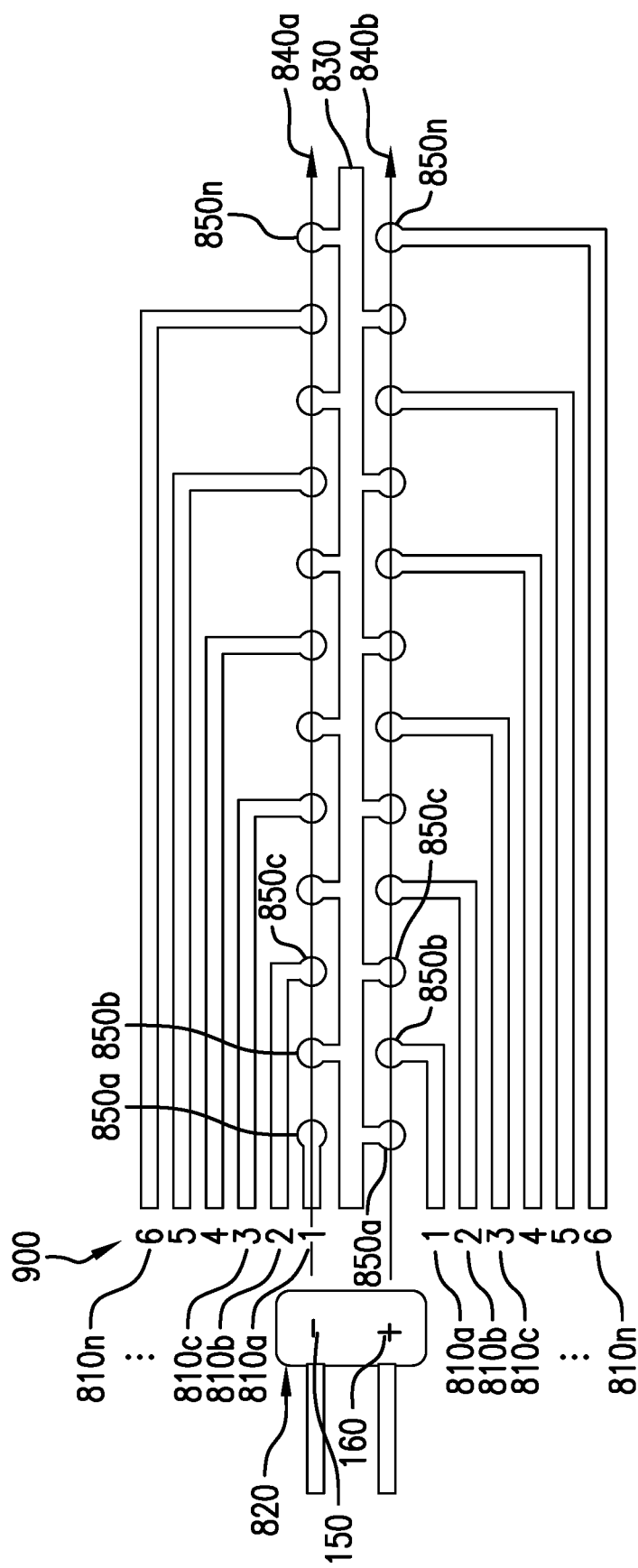
FIG. 9 depicts a schematic view of a digit display circuit that is associated with the user interface display of the door closer.

FIG. 9 depicts a schematic view of a digit display circuit 900. The digit display circuit 900 is included in the user interface display system 730 that is positioned on the door closer 720. As the user manually adjusts the adjustment setting of the door closer 720, the controller 110 automatically adjusts the sliding contact 820 along the sliding contact bus 840a and sliding contact bus 840b in correspondence with the user manually adjusting the adjustment setting of the door closer 720. As the user manually transitions the adjustment setting of the door closer 720 from adjustment setting to adjustment setting, the controller 110 automatically transitions the sliding contact 820 to the corresponding contact 850(a-n) as positioned along the sliding contact bus 840a and the sliding contact bus 840b. For example, door closer 720 is currently set at the adjustment setting of "1" and thus the sliding contact 820 is positioned at contacts 850a on the sliding contact bus 840a and contact 850a on the sliding contact bus 840b. As the user manually transitions the adjustment setting of the door closer 720 from the adjustment setting of "1" to the adjustment setting of "2", the controller 110 automatically transitions the sliding contact 820 from being positioned at contact 850a on the sliding contact bus 840a and contact 850a on the sliding contact bus 850b to the contact 850b on the sliding contact bus 840a and contact 850b positioned on the sliding contact bus 840b.

The controller 110 may determine the contact 850(a-n) that corresponds to an adjustment setting that the door closer 720 is set. Each adjustment setting of the door closer 720 is associated with a corresponding contact 850(a-n). The controller 110 may adjust the voltage applied to the contact 850(a-n) that corresponds to the adjustment setting that the door closer 720 is set to activate the adjustment setting feedback pattern 810(a-n) that is depicted by the user interface display 140 to correspond to the adjustment setting that the door closer 720 is set. As the user manually adjusts the adjustment setting of the door closer 720, the sliding contact 820 automatically transitions to the contact 850(a-n) along the sliding contact bus 840a and the sliding contact bus 840b that corresponds to the adjustment setting of the door closer 720. As the sliding contact 820 engages the contact 850(a-n), the controller 110 then applies the negative voltage 150 to the contact 850(a-n) on the sliding contact bus 840a and then the positive voltage 160 to the contact 850(a-n) on the sliding contact bus 840b. In applying the negative voltage 150 and the positive voltage 160 to the contact 850(a-n) along the sliding contact bus 840a and the sliding contact bus 840b, the electrochromic filter 120 is then activated to display the adjustment setting feedback pattern 810(a-n) that corresponds to the contact 850(a-n) that the negative voltage 150 and the positive voltage 160 is applied. In doing so, the user interface display 140 then displays to the user the adjustment setting feedback pattern 810(a-n) that corresponds to the current adjustment setting of the door closer 720.

For example, adjustment setting of the door closer 720 is currently at the adjustment setting of "2". In doing so, sliding contact 820 is initially positioned on the contact 850b on the sliding contact bus 840a and contact 850b on the sliding contact bus 840b. The negative voltage 150 is then applied to the contact 850b on the sliding contact bus 840a and the positive voltage 160 is applied to the contact 850b on the sliding contact bus 840b. The application of the negative voltage 150 to the contact 850b on the sliding contact bus 840a and the positive voltage 160 applied to the contact 850b on the sliding contact bus 840b transitions the electrochromic filter 120 to depict the adjustment setting feedback pattern 810b such that the user interface display 140 displays to the user the adjustment setting feedback pattern 810b of "2" that corresponds to the current adjustment setting of the door closer of "2".

The user then manually adjusts the adjustment setting of the door closer 720 from the adjustment setting of "2" to the adjustment setting of "3". The controller 110 may then automatically transition the sliding contact 820 from being positioned on the contact 850b on the sliding contact bus 840a and the contact 850b on the sliding contact bus 840b to being positioned on the contact 850c on the sliding contact bus 840a and the contact 850c on the sliding contact bus 840b. In doing so, the controller 110 may then apply the negative voltage 150 to the contact 850c on the sliding contact bus 840a and the positive voltage 160 to the contact 850c on the sliding contact bus 840b. The electrochromic filter 120 may then be transitioned from depicting the adjustment setting feedback pattern 810b of "2" to the depicting the adjustment setting feedback pattern 810c of "3". The user interface display 140 may then transition the display to the user the adjustment setting feedback pattern 810b of "2" to the display to the user the automatic setting feedback pattern 810 of "3". In doing so, the user may easily determine that the adjustment setting of the door closer has transitioned from the adjustment setting of "2" to the adjustment setting of "3". Thus, the controller 110 may adjust the negative voltage 150 and the positive voltage 160 that is applied to each contact 850(a-n) to correspond to the adjustment setting that the door closer 720 is set at as the user adjusts the adjustment setting of the door closer 720 to adjust the adjustment setting feedback pattern 810(a-n) that is depicted by the user interface display 140 to correspond to the adjustment setting that the door closer 720 is set as the user adjusts the adjustment setting of the door closer 720.

Electrochromic Visual Feedback Display System Associated with a Door Closer

Figure 10:
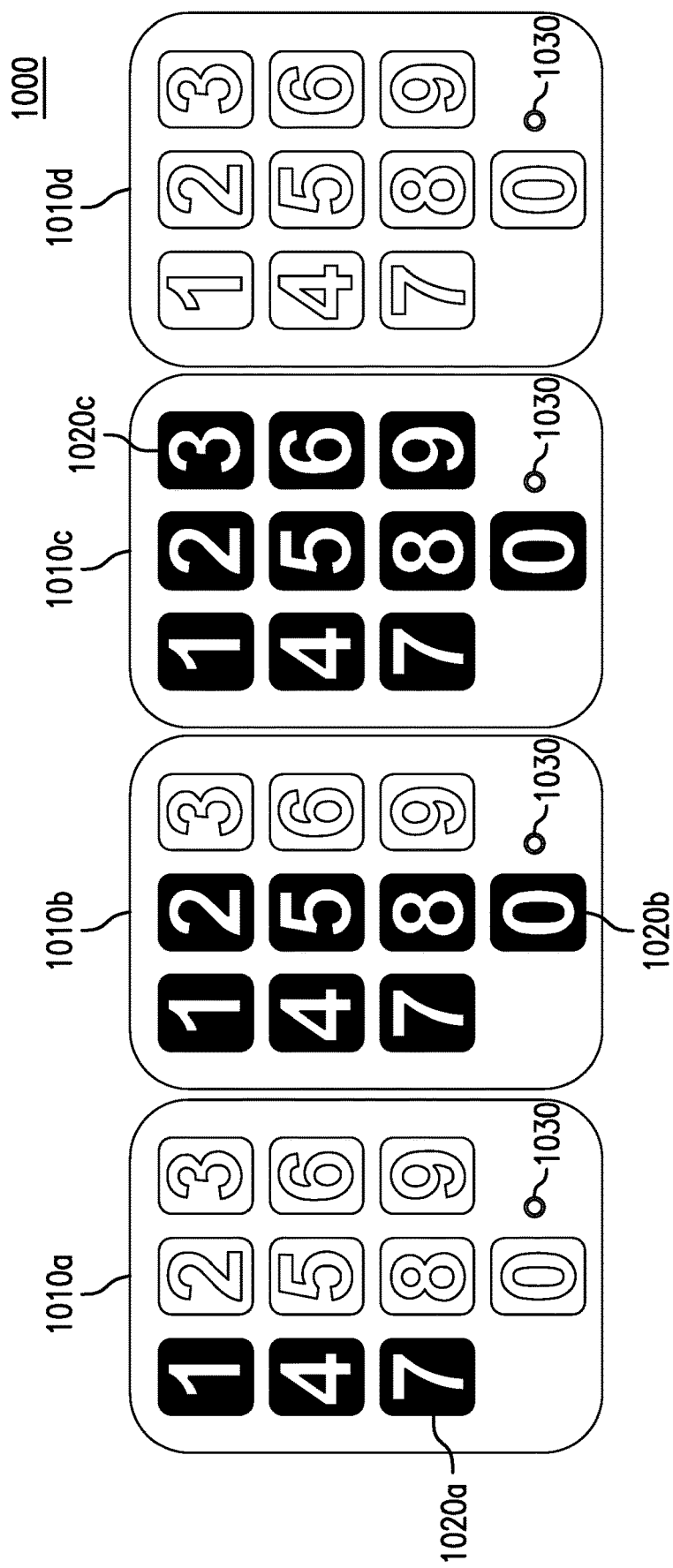
FIG. 10 depicts an elevational view of an electronic lock configuration that provides progressive feedback to the user as the user enters the access code.

FIG. 10 depicts an elevational view of an electronic lock configuration 1000. The electronic lock configuration includes an electronic lock keypad 1010(a-n). The electronic lock keypad 1010(a-n) provides progressive feedback to the user as the user enters an access code into the electronic lock keypad 1010(a-n). As the user correctly enters each digit of the access code into the electronic lock keypad 1010(a-n).

Each row of digits 1020(*a-n*), where n is equal to the amount of rows of digits positioned on the electronic lock keypad 1010(*a-n*), positioned on the electronic lock keypad 1010 (*a-n*) may transition color to depict to the user whether the user correctly entered each digit of the access code into the electronic lock keypad 1010(*a-n*). Thus, the user may receive feedback following the entering of each digit of the access code into the electronic lock keypad 1010(*a-n*) as to whether the user correctly entered each digit of the access code.

The electronic lock keypad 1010(*a-n*) includes a access code indicator 1030. The access code indicator 1030 may be an LED that emits a color as the user enters the access code into the electronic lock keypad 1010(*a-n*). Conventionally, the user would engage the electronic lock keypad 1010(*a-n*) to enter the access code. The access code indicator 1030 then begins flashing, such as flashing the color "YELLOW", as the user begins to enter the access code into the electronic lock keypad 1010(*a-n*) to indicate to the user that the access code entry process has been initiated. The access code indicator 1030 then remains flashing until the user correctly enters the complete access code into the electronic lock keypad 1010(*a-n*) and the access code indicator 1030 then terminates flashing and/or transitions to emit the color "GREEN" to indicate to the user that the user has correctly entered the complete access code into the electronic lock keypad 1010(*a-n*). The access code indicator 1030 remains flashing when the user fails to correctly enter the complete access code and/or transitions to emit the color "RED" to indicate to the user that the user has failed to correctly enter the complete access code into the electronic lock keypad 1010(*a-n*).

However, the conventional approach of providing feedback to the user via the access code indicator 1030 after the user has attempted to enter the complete access code into the electronic lock keypad 1010(*a-n*) fails to provide the user any feedback as to which digit of the access code that the user failed to enter correctly into the electronic lock keypad 1010(*a-n*). In an embodiment, the electronic lock keypad 1010(*a-n*) may include strips of electrochromic filters (not shown). Each strip of electrochromic filters may be positioned behind a corresponding row of digits 1020(*a-n*) included in the electronic lock keypad 1010(*a-n*). For example, a first electrochromic filter strip may be positioned behind the row of digits 1020*a*, a second electrochromic filter strip may be positioned behind the row of digits 1020*b*, and a third electrochromic filter strip may be positioned behind the row of digits 1020*c*.

The controller 110 associated with the electronic lock keypad 1010(*a-n*) may then transition each electrochromic strip to depict a specific color that corresponds to whether the user correctly entered each digit of the access code into the electronic lock keypad 1010(*a-n*). In doing so, the user may then receive feedback following the entry of each digit included in the access code as to whether the user correctly entered each digit of the access code into the electronic lock keypad 1010(*a-n*). For example, the access code required for the user to enter into the electronic lock keypad 1010(*a-n*) to transition the electronic lock associated with the electronic lock keypad 1010(*a-n*) from the locked state to the unlocked state is the four digit combination of "1234". The user initially enters the first digit of the access code of "1" into the electronic lock keypad 1010*a*. The controller 110 then determines whether the first digit of the access code of "1" entered by the user correctly corresponds to the first digit of the access code of "1234". The controller 110 identifies that the first digit of the access code of "1" entered by the user correctly corresponds to the first digit of the access code of "1234". The controller 110 then transitions the first electrochromic filter strip that is positioned behind the row of digits 1020*a* to transition to the color "GREEN" to depict to the user that the user has correctly entered the first digit of "1" of the access code.

The user then attempts to enter the second digit of the access code of "5" into the electronic lock keypad 1010*b*. The controller 110 then determines whether the second digit of the access code that the user attempted to enter of "5" entered by the user correctly corresponds to the second digit of the access code of "2". The controller 110 identifies that the second digit that the user attempted to enter as the access code of "5" fails to correctly correspond to the second digit of the access code of "1234". The controller 110 then maintains the second electrochromic strip that is positioned behind the row of digits 1020*b* to remain in the color of "CLEAR" to depict to the user that the user has failed to correctly enter the second digit of "2" of the access code. In an embodiment, the controller 110 transitions the second electrochromic strip that is positioned behind the row of digits 1020*b* to transition to the color of "RED" to depict to the user that the user has failed to correctly enter the second digit of "2" of the access code.

Rather than the user not receiving feedback that the user failed to correctly enter the second digit of "2" of the access code, the controller 110 determines that the user failed to correctly enter the second digit of "2" of the access code and then instructs the electrochromic filter to maintain in the "CLEAR" state and/or transition to the color "RED" to indicate to the user that the user failed to correctly enter the second digit of "2" of the access code. In doing so, the user recognizes that the user failed to correctly enter the second digit of "2" of the access code and thereby then enters the correct second digit of the access code of "2" into the electronic keypad 1010*b*. The controller 110 then determines whether the adjusted digit of the access code that the user attempted to enter of "2" correctly corresponds to the second digit of the access code of "2". The controller 110 identifies that the adjusted digit of the access code that the user attempted to enter of "2" correctly corresponds to the second digit of the access code of "1234". The controller 110 then transitions the second electrochromic strip that is positioned behind the row of digits 1020*b* to transition to the color "GREEN" to depict to the user that the user has correctly entered the second digit of "2" into the access code.

The user then enters the third digit of the access code of "3" into the electronic lock keypad 1010*c*. The controller 110 then determines whether the third digit of the access code of "3" entered by the user correctly corresponds to the third digit of the access code of "1234". The controller 110 identifies that the third digit of the access code of "3" entered by the user correctly corresponds to the third digit of the access code of "1234". The controller 110 then transitions the third electrochromic filter strip that is positioned behind the row of digits 1020*c* to transition to the color "GREEN" to depict to the user that the user has correctly entered the third digit of "3" of the access code.

The user then enters the fourth digit of the access code of "4" into the electronic lock keypad 1010*d*. The controller 110 then determines whether the fourth digit of the access code of "4" entered by the user correctly corresponds to the fourth digit of the access code of "1234". The controller 110 identifies that the fourth digit of the access code of "4" entered by the user correctly corresponds to the fourth digit of the access code of "1234". The controller 110 then transitions the first electrochromic strip positioned behind the row of digits of 1020*a*, the second electrochromic strip positioned behind the row of digits 1020*b*, and the third electrochromic strip positioned behind the row of digits 1020*c* from the color "GREEN" to the color of "CLEAR". In doing so, the user may then easily identify that the user has correctly entered each of the four digits of the access code of "1234" and that the electronic lock associated with the electronic lock keypad 1010*d* is transitioned from the locked state to the unlocked state to enable the user to access the space associated with the electronic lock keypad 1010*d*. Thus, the user may have received progressive feedback when entering the access code into the electronic lock keypad 1010(*a*-*d*) as to the progress in the user correctly entering each digit of the access code into the electronic lock keypad 1010(*a*-*d*).

Access Control Device System Overview

Figure 11:
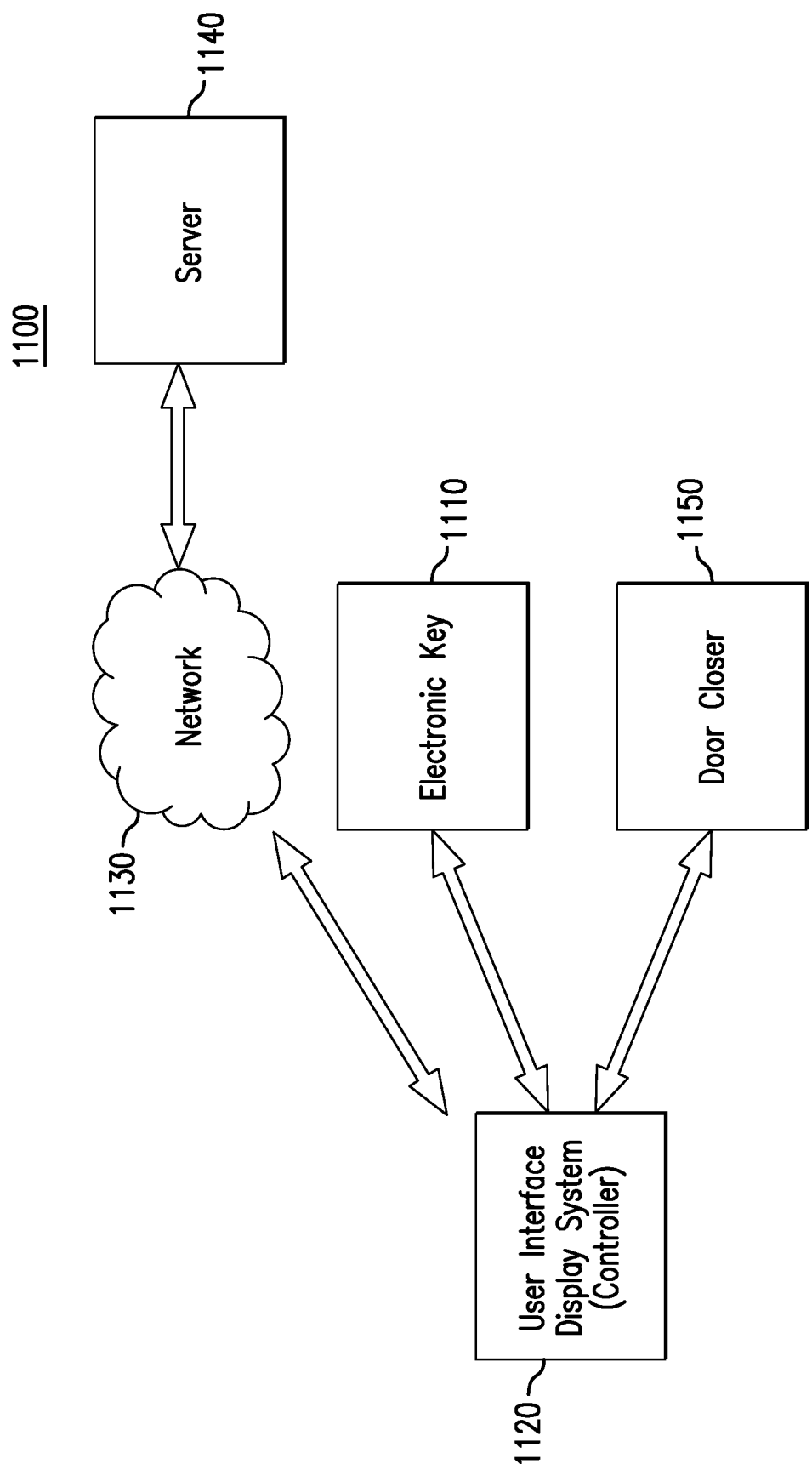
FIG. 11 is a block diagram of an exemplary electronic key configuration that incorporates the user interface display systems discussed in detail above.

FIG. 11 is a block diagram of an exemplary electronic key configuration 1100 that incorporates the user interface display systems discussed in detail above. For example, the electronic key configuration 1100 may incorporate the user interface display system 100 into the user interface display system 1120 which operates as the controller for the electronic key 1110. In another example, the electronic key configuration 1100 may incorporate the user interface display system 100 into the door closer 1150. In doing so, the user interface display system 1120 as operating as the controller of the electronic key 1110 and/or the door closer 1150 may control one or more components of the electronic key 1110 and/or the door closer 1150 as the electronic key 1110 and/or the door closer 1150 operates. For example, the electronic key 1110 may be a key system and the user interface display system 1120 determines when the electronic key 1110 has provided the appropriate credential to the corresponding electronic lock to provide feedback to the user as to whether the appropriate credential has been provided.

The electronic key 1110 and/or door closer 1150 that the user interface display system 1120 may act as the controller for may include but is not limited to electronic keys, mechanical keys, door closers, door operators, auto-operators, credential readers, hotspot readers, electronic locks including mortise, cylindrical, and/or tabular locks, exit devices, panic bars, wireless reader interfaces, gateway devices, plug-in devices, peripheral devices, doorbell camera systems, door closer control surveillance systems and/or any other type of access control device that regulates access control to a space that will be apparent to those skilled in the relevant art(s) without departing from the spirit and scope of the disclosure.

The user interface display system 1120 when operating as the controller for the electronic key 1110 and/or door closer 1150 may control one or more components of the electronic key 1110 and/or door closer 1150 as the electronic key 1110 and/or door closer 1150 operates such as but not limited to, providing the credential associated with the user of the electronic key, transitioning the adjustment setting of the door closer, extending/retracting a door latch, engaging/disengaging a dogging mechanism on an exit device, opening/closing a door via a door closer/operator, moving a primer mover, controlling an electric motor, and/or any other type of action that enables the electronic key 1110 to regulate the opening and/or closing of a door that provides access to a space and/or enables the door closer 1150 to adjust the adjustment setting of the door closer 1150 that will be apparent to those skilled in the relevant art(s) without departing from the spirit and scope of the disclosure.

The user interface display system 1120 when operating as the controller for the electronic key 1110 and/or door closer 1150 may receive data from the electronic key 1110 and/or door closer 1150 as well any type of component included in the electronic key 110 and/or door closer 1150 that may provide data to the user interface display system 1120 for the user interface display system 1120 to adequately instruct the electronic key 1110 and/or door closer 1150 as to how to operate to adequately regulate how the door opens and/or closes to provide access to the space.

For example, sensors included in the electronic key 1110 and/or door closer 1150 may send data to the user interface display system 1120 indicating whether the credential associated with the electronic key 1110 has been accepted by the electronic lock and/or the door closer 1150 may send data to the user interface display system 1120 indicating that a person has departed from the door after the door closed behind the person. The user interface display system 1120 may then instruct the door latch to retract thereby unlocking the door and/or to extend thereby locking the door. The user interface display system 1120 may receive data from any type of component included in the electronic key 1110 and/or door closer 1150 that includes but is not limited to sensors, credential readers, biometric sensing devices, user interface devices, and/or any other component that may provide data to the user interface display system 1120 to adequately instruct the electronic key 1110 and/or door closer 1150 to execute actions to regulate the door providing access to the space that will be apparent to those skilled in the relevant art(s) without departing from the spirit and scope of the disclosure.

The user interface display system 1120 may communicate to with the electronic key 1110 and/or door closer 1150 via wire-line communication and/or wireless communication. The user interface display system 1120 may engage in wireless communication with the electronic key 1110 and/or door closer 1150 that includes but is not limited to Bluetooth, BLE, Wi-Fi, and/or any other wireless communication protocol that will be apparent to those skilled in the relevant art(s) without departing from the spirit and scope of the disclosure. The user interface display system 1120 may communicate with the server 1140 via network 1130.

System Overview

Figure 12:
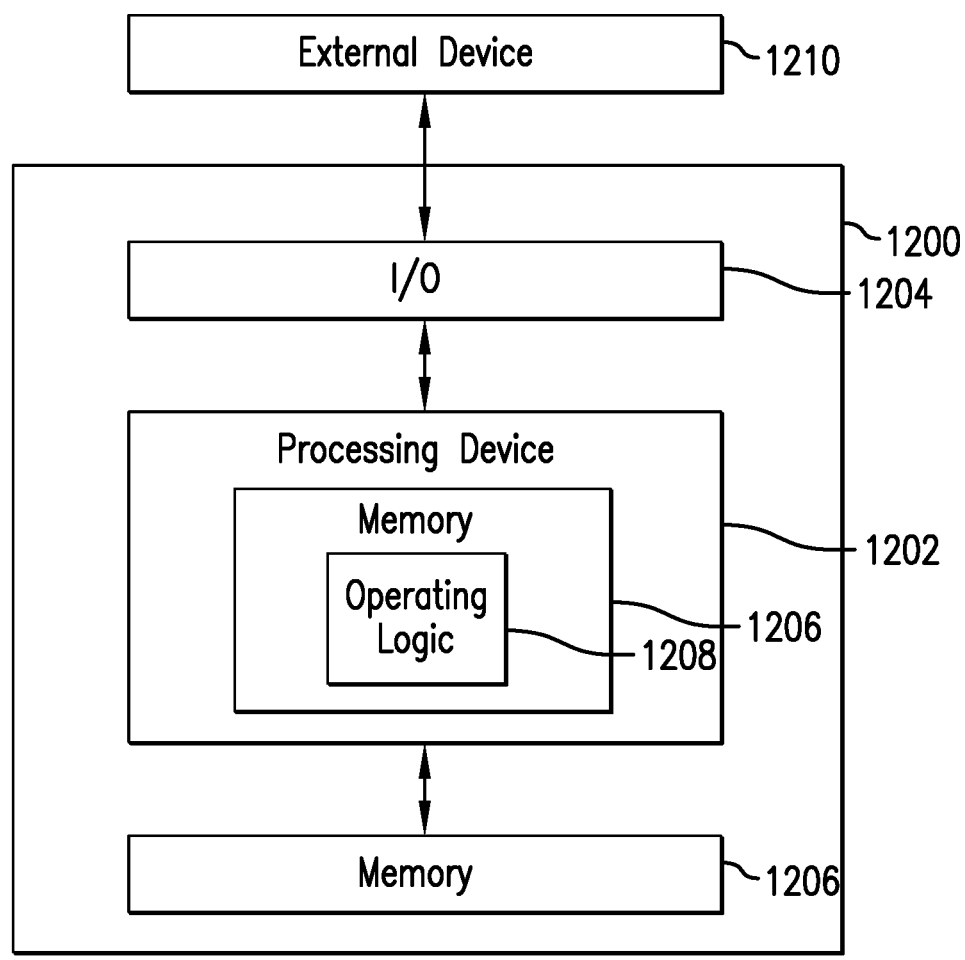
FIG. 12 is a block diagram of at least one embodiment of a computing device.

Referring now to FIG. 12, a simplified block diagram of at least one embodiment of a computing device 1200 is shown. The illustrative computing device 1200 depicts at least one embodiment of a controller 110 for the user interface display system 100 illustrated in FIG. 1. Depending on the particular embodiment, computing device 1200 may be embodied as a reader device, credential device, door control device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communications device capable of performing the functions described herein.

The computing device 1200 includes a processing device 1202 that executes algorithms and/or processes data in accordance with operating logic 1208, an input/output device 1204 that enables communication between the computing device 1200 and one or more external devices 1210, and memory 1206 which stores, for example, data received from the external device 1210 via the input/output device 1204.

The input/output device 1204 allows the computing device 1200 to communicate with the external device 1210. For example, the input/output device 1204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, WiMAX, etc.) to effect such communication depending on the particular computing device 1200. The input/output device 804 may include hardware, software, and/or firmware suitable for performing the techniques described herein.

The external device 1210 may be any type of device that allows data to be inputted or outputted from the computing device 1200. For example, in various embodiments, the external device 1210 may be embodied as controller 110 in the user interface display system 100. Further, in some embodiments, the external device 1210 may be embodied as another computing device, switch, diagnostic tool, controller, printer, display, alarm, peripheral device (e.g., keyboard, mouse, touch screen display, etc.), and/or any other computing, processing, and/or communications device capable of performing the functions described herein. Furthermore, in some embodiments, it should be appreciated that the external device 1210 may be integrated into the computing device 1200.

The processing device 1202 may be embodied as any type of processor(s) capable of performing the functions described herein. In particular, the processing device 1202 may be embodied as one or more single or multi-core processors, microcontrollers, or other processor or processing/controlling circuits. For example, in some embodiments, the processing device 1202 may include or be embodied as an arithmetic logic unit (ALU), central processing unit (CPU), digital signal processor (DSP), and/or another suitable processor(s). The processing device 1202 may be a programmable type, a dedicated hardwired state machine, or a combination thereof. Processing devices 1202 with multiple processing units may utilize distributed, pipelined, and/or parallel processing in various embodiments. Further, the processing device 1202 may be dedicated to performance of just the operations described herein, or may be utilized in one or more additional applications. In the illustrative embodiment, the processing device 1202 is of a programmable variety that executes algorithms and/or processes data in accordance with operating logic 1208 as defined by programming instructions (such as software or firmware) stored in memory 1206. Additionally or alternatively, the operating logic 1208 for processing device 1202 may be at least partially defined by hardwired logic or other hardware. Further, the processing device 1202 may include one or more components of any type suitable to process the signals received from input/output device 1204 or from other components or devices and to provide desired output signals. Such components may include digital circuitry, analog circuitry, or a combination thereof.

The memory 1206 may be of one or more types of non-transitory computer-readable media, such as a solid-state memory, electromagnetic memory, optical memory, or a combination thereof. Furthermore, the memory 1206 may be volatile and/or nonvolatile and, in some embodiments, some or all of the memory 1206 may be of a portable variety, such as a disk, tape, memory stick, cartridge, and/or other suitable portable memory. In operation, the memory 1206 may store various data and software used during operation of the computing device 1200 such as operating systems, applications, programs, libraries, and drivers. It should be appreciated that the memory 1206 may store data that is manipulated by the operating logic 1208 of processing device 1202, such as, for example, data representative of signals received from and/or sent to the input/output device 1204 in addition to or in lieu of storing programming instructions defining operating logic 1208. As shown in FIG. 12, the memory 1206 may be included with the processing device 1202 and/or coupled to the processing device 1202 depending on the particular embodiment. For example, in some embodiments, the processing device 1202, the memory 1206, and/or other components of the computing device 1200 may form a portion of a system-on-a-chip (SoC) and be incorporated on a single integrated circuit chip.

In some embodiments, various components of the computing device 1200 (e.g., the processing device 1202 and the memory 1206) may be communicatively coupled via an input/output subsystem, which may be embodied as circuitry and/or components to facilitate input/output operations with the processing device 1202, the memory 1206, and other components of the computing device 1200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 1200 may include other or additional components, such as those commonly found in a typical computing device (e.g., various input/output devices and/or other components), in other embodiments. It should be further appreciated that one or more of the components of the computing device 1200 described herein may be distributed across multiple computing devices. In other words, the techniques described herein may be employed by a computing system that includes one or more computing devices. Additionally, although only a single processing device 1202, I/O device 1204, and memory 1206 are illustratively shown in FIG. 12, it should be appreciated that a particular computing device 1200 may include multiple processing devices 1202, I/O devices 1204, and/or memories 1206 in other embodiments. Further, in some embodiments, more than one external device 1210 may be in communication with the computing device 1200.

CONCLUSION

It is to be appreciated that the Detailed Description section, and not the Abstract section, is intended to be used to interpret the claims. The Abstract section may set forth one or more, but not all exemplary embodiments, of the present disclosure, and thus, are not intended to limit the present disclosure and the appended claims in any way.

The present disclosure has not been described above with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships are appropriately performed.

It will be apparent to those skilled in the relevant art(s) that various changes in form and in detail can be made without departing from the spirit and scope of the present disclosure. Thus the present disclosure should not be limited by any of the above-described exemplary embodiments, but should be defined only in accordance with the following claims and their equivalents.

What is claimed is:

1. A user interface display system associated with an electronic key that provides feedback to a user engaging an electronic lock with the electronic key, comprising:
 a user interface display positioned on the electronic key and configured to depict to the user a plurality of feedback patterns with each displayed feedback pattern being in response to the user engaging the electronic lock with the electronic key, wherein each displayed feedback pattern provides feedback to the user as the user engages the electronic lock with the electronic key;
 an electrochromic filter positioned on the electronic key and configured to transition a color depicted by the user interface display to correspond to the feedback pattern depicted by the user interface display, wherein each displayed feedback pattern provides a corresponding color associated with the feedback that is provided to the user as the user engages the electronic lock with the electronic key; and
 a controller configured to transition the electrochromic filter to each color to correspond with the feedback pattern that is depicted by the user interface display so that the transitioned color and the displayed feedback pattern is in response to the user engaging the electronic lock with the electronic key.

2. The user interface display system of claim 1, wherein the controller is further configured to:
 communicate with the electronic lock to determine whether a credential associated with the electronic key is accepted by the electronic lock;
 transition the electrochromic filter to display an accepted feedback pattern that is depicted by the user interface display when the credential associated with the electronic key is accepted by the electronic lock, wherein the accepted feedback pattern communicates to the user that the credential associated with the electronic key is accepted by the electronic lock; and
 transition the electrochromic filter to display a rejected feedback pattern that is depicted by the user interface display when the credential associated with the electronic key is rejected by the electronic lock, wherein the rejected feedback pattern communicates to the user that the credential associated with the electronic key is rejected by the electronic lock.

3. The user interface display system of claim 2, wherein the controller is further configured to instruct a light source associated with the user interface display positioned on the electronic key to emit each light pattern via the user interface display to the user that corresponds to each displayed feedback pattern in response to the user engaging the electronic lock with the electronic key.

4. The user interface display system of claim 1, further comprising:
 a plurality of power contacts positioned on the electronic key and configured to receive power from the electronic lock when the electronic key is inserted into the electronic lock so that the power contacts engage a power source associated with the electronic lock; and
 wherein the power received from the electronic lock is provided to the controller and the user interface display to power the controller and the user interface display when the power contacts engage the power source associated with the electronic lock.

5. The user interface display system of claim 4, further comprising:
 a power source positioned on the electronic key and configured to provide power to the electronic lock when the electronic key is inserted into the electronic lock so that the power contacts engage the power source associated with the electronic lock; and
 wherein the power received from the power source positioned on the electronic key is provided to the power source associated with the electronic lock when the power contacts engage the power source associated with the electronic lock.

6. The user interface display system of claim 1, further comprising:
 a portable user interface display system positioned on a mechanical lock and configured to:
 provide a user interface display positioned on the portable user interface display system and depicts to the user the feedback patterns in response to the user engaging an adaptable mechanical lock with the mechanical key, wherein the portable user interface display system is removable from the mechanical key;
 provide an electrochromic filter positioned on the portable user interface display system and transitions to a color depicted by the user interface as the user engages the adaptable mechanical lock with the mechanical key, wherein the adaptable mechanical lock is a mechanical lock that is adapted to engage the portable user interface display system; and
 provide a controller positioned on the portable user interface display system and transitions the electrochromic filter to each color to correspond with the feedback pattern that is depicted by the user interface display in response to the user engaging the adaptable mechanical lock with the with the mechanical key.

7. The user interface display system of claim 6, wherein the portable user interface display system is further configured to:
 engage with the adaptable mechanical lock via a communication line, wherein the communication line of the portable user interface display system engages a communication line of the adaptable mechanical lock to enable communication between the portable user interface display system and the adaptable mechanical lock; and
 engage with the adaptable mechanical lock via a plurality of power contacts, wherein the power contacts of the portable user interface display system engages a plurality of power contacts of the adaptable mechanical lock to enable power to be provided between the portable user interface display system and the adaptable mechanical lock.

8. A method for providing feedback to a user engaging an electronic lock with an electronic key, comprising:
 depicting to the user a plurality of feedback patterns via a user interface display positioned on an electronic key with each displayed feedback pattern being in response to the user engaging the electronic lock with the electronic key, wherein each feedback pattern that is displayed to the user provides the feedback to the user as the user engages the electronic lock with the electronic key;
 transitioning a color depicted by the user interface display via an electrochromic filter to correspond to the feedback pattern depicted by the user interface display, wherein each displayed feedback pattern provides a corresponding color associated with the feedback that is provided to the user as the user engages the electronic lock with the electronic key; and transitioning the electrochromic filter to each color via a controller to correspond with the feedback pattern that is depicted by the user interface display so that the transitioned color and the displayed feedback pattern is in response to the user engaging the electronic lock with the electronic key.

9. The method of claim 8, further comprising:

communicating with the electronic lock to determine whether a credential associated with the electronic key is accepted by the electronic lock;

transitioning the electrochromic filter to display an accepted feedback pattern that is depicted by the user interface display when the credential associated with the electronic key is accepted by the electronic lock, wherein the accepted feedback pattern communicates to the user that the credential associated with the electronic key is accepted by the electronic lock; and transitioning the electrochromic filter to display a rejected feedback pattern that is depicted by the user interface display when the credential associated with the electronic key is rejected by the electronic lock, wherein the rejected feedback pattern communicates to the user that the credential associated with the electronic key is rejected by the electronic lock.

10. The method of claim 9, further comprising:

instructing a light source associated with the user interface display positioned on the electronic key to emit each light pattern via the user interface display to the user that corresponds to each displayed feedback pattern in response to the user engaging the electronic lock with the electronic key.

11. The method of claim 8, further comprising:

receiving power from the electronic lock via a plurality of power contacts positioned on the electronic key when the electronic key is inserted into the electronic lock so that the power contacts engage a power source associated with the electronic lock, wherein the power received from the electronic lock is provided to the controller and the user interface display to power the controller and the user interface display when the power contacts engage the power source associated with the electronic lock.

12. The method of claim 11, further comprising:

providing power to the electronic lock via a power source positioned on the electronic key when the electronic key is inserted into the electronic lock so that the power contacts engage the power source associated with the electronic lock, wherein the power received from the power source positioned on the electronic key is provided to the power source associated with the electronic lock when the power contacts engage the power source associated with the electronic lock.

13. The method of claim 8, further comprising:

providing a user interface display positioned on a portable user interface display system and depicting to the user the feedback patterns in response to the user engaging an adaptable mechanical lock with the mechanical key, wherein the portable user interface display system is removable from a mechanical key;

providing an electrochromic filter positioned on the portable user interface display system and transitions to a color depicted by the user interface display as the user engages the adaptable mechanical lock that is adapted to engage the portable user interface display system; and providing a controller positioned on the portable user interface display system and transitions the electrochromic filter to each color to correspond with the feedback pattern that is depicted by the user interface display in response to the user engaging the adaptable mechanical lock with the mechanical key.

14. The method of claim 13, further comprising:

engaging with the adaptable mechanical lock via a communication line, wherein the communication line of the portable user interface display system engages a communication line of the adaptable mechanical lock to enable communication between the portable user interface display system and the adaptable mechanical lock; and engaging with the adaptable mechanical lock via a plurality of power contacts, wherein the power contacts of the portable user interface display system engages a plurality of power contacts of the adaptable mechanical lock to enable power to be provided between the portable user interface display system and the adaptable mechanical lock.

15. A user interface display system positioned on a door closer that provides feedback to a user that is engaging the user interface display system of the door closer, comprising:

a user interface display configured to depict to the user a plurality of adjustment setting feedback patterns with each adjustment setting feedback pattern that is displayed is in response to the user engaging the user interface display system positioned on the door closer, wherein each adjustment setting feedback pattern that is displayed to the user provides the feedback to the user as the user engages the user interface display system of the door closer;

an electrochromic filter positioned on the door closer and configured to transition a color depicted by the user interface display to correspond to the adjustment setting feedback pattern depicted by the user interface display, wherein each adjustment setting feedback pattern that is displayed to the user provides a corresponding color that is associated with the feedback that is provided to the user as the user engages the door closer; and a controller configured to transition the electrochromic filter to each color to correspond with the adjustment setting feedback pattern that is depicted by the user interface display so that the transitioned color and the adjustment setting feedback pattern that is displayed is in response to the user engaging the door closer.

16. The user interface display system of claim 15, wherein the controller is further configured to:

determine an adjustment setting associated with the door closer that the door closer is set, wherein the adjustment setting associated with the door closer corresponds to the amount of force that the door closer is set to apply to a door associated with the door closer; and transition the electrochromic filter to display an adjustment setting feedback pattern that is depicted by the user interface display that corresponds to the adjustment setting that the door closer is set, wherein the adjustment setting feedback pattern provides feedback to the user as to the adjustment setting that the door closer is set.

17. The user interface display system of claim 16, wherein the controller is further configured to:

determine the adjustment setting associated with the door closer as the user adjusts the adjustment setting; and transition the electrochromic filter to adjust the adjustment setting feedback pattern that is depicted by the user interface display to correspond to the adjusted adjustment setting of the door closer as adjusted by the user to provide feedback to the user as to the adjusted adjustment setting that that the door closer is set.

18. The user interface display system of claim 17, wherein the controller is further configured to:

adjust a voltage applied to a contact from a plurality of contacts that corresponds to an adjustment setting feedback pattern that is depicted by the user interface display to correspond to the adjustment setting that the door closer is set; and depict by the user interface display the adjustment setting feedback pattern when the voltage is applied to the contact that corresponds to the adjustment setting feedback pattern to depict to the user the adjustment setting that the door closer is set.

19. The user interface display system of claim 18, wherein the controller is further configured to:

determine the contact from the plurality of contacts that corresponds to an adjustment setting that the door closer is set, wherein each adjustment setting of the door closer is associated with a corresponding contact; and adjust the voltage applied to the contact that corresponds to the adjustment setting that the door closer is set to activate the adjustment setting feedback pattern that is depicted by the user interface display to correspond to the adjustment setting that the door closer is set.

20. The user interface display system of claim 19, wherein the controller is further configured to adjust the voltage applied to each contact to correspond to the adjustment setting that the door closer is set as the user adjusts the adjustment setting of the door closer to adjust the adjustment setting feedback pattern that is depicted by the user interface display to correspond to the adjustment setting that the door closer is set as the user adjusts the adjustment setting of the door closer.

\* \* \* \* \*